US008618990B2

(12) United States Patent
Somero

(10) Patent No.: US 8,618,990 B2
(45) Date of Patent: Dec. 31, 2013

(54) WIDEBAND ANTENNA AND METHODS

(75) Inventor: Vesna Somero, Oulu (FI)

(73) Assignee: Pulse Finland Oy, Kempele (FI)

( * ) Notice: Subject to any disclaimer, the term of this patent is extended or adjusted under 35 U.S.C. 154(b) by 330 days.

(21) Appl. No.: 13/086,319

(22) Filed: Apr. 13, 2011

(65) Prior Publication Data
US 2012/0262343 A1    Oct. 18, 2012

(51) Int. Cl.
*H01Q 1/24* (2006.01)
(52) U.S. Cl.
USPC .......................................... 343/702; 343/722
(58) Field of Classification Search
USPC .................... 343/722, 702, 844, 772, 793
See application file for complete search history.

(56) References Cited

U.S. PATENT DOCUMENTS

| 2,745,102 | A | 5/1956 | Norgorden |
| 3,938,161 | A | 2/1976 | Sanford |
| 4,004,228 | A | 1/1977 | Mullett |
| 4,028,652 | A | 6/1977 | Wakino et al. |
| 4,031,468 | A | 6/1977 | Ziebell et al. |
| 4,054,874 | A | 10/1977 | Oltman |
| 4,069,483 | A | 1/1978 | Kaloi |
| 4,123,756 | A | 10/1978 | Nagata et al. |
| 4,123,758 | A | 10/1978 | Shibano et al. |
| 4,131,893 | A | 12/1978 | Munson et al. |
| 4,201,960 | A | 5/1980 | Skutta et al. |
| 4,255,729 | A | 3/1981 | Fukasawa et al. |
| 4,313,121 | A | 1/1982 | Campbell et al. |
| 4,356,492 | A | 10/1982 | Kaloi |
| 4,370,657 | A | 1/1983 | Kaloi |
| 4,423,396 | A | 12/1983 | Makimoto et al. |
| 4,431,977 | A | 2/1984 | Sokola et al. |
| 4,546,357 | A | 10/1985 | Laughon et al. |
| 4,559,508 | A | 12/1985 | Nishikawa et al. |
| 4,625,212 | A | 11/1986 | Oda et al. |
| 4,652,889 | A | 3/1987 | Bizouard et al. |
| 4,661,992 | A | 4/1987 | Garay et al. |
| 4,692,726 | A | 9/1987 | Green et al. |
| 4,703,291 | A | 10/1987 | Nishikawa et al. |

(Continued)

FOREIGN PATENT DOCUMENTS

| CN | 1316797 | 10/2007 |
| DE | 10015583 | 11/2000 |

(Continued)

OTHER PUBLICATIONS

"An Adaptive Microstrip Patch Antenna for Use in Portable Transceivers", Rostbakken et al., Vehicular Technology Conference, 1996, Mobile Technology For The Human Race, pp. 339-343.

(Continued)

*Primary Examiner* — Thien M Le
(74) *Attorney, Agent, or Firm* — Gazdzinski & Associates, PC

(57) ABSTRACT

A wideband antenna for use portable radio devices, and methods for operating the same. In one embodiment, a monopole antenna is used within a laptop computing device. The antenna comprises a monopole radiator coupled to an auxiliary ground plane element, and is placed substantially outside of the footprint of the computer display ground plane. In one implementation, the auxiliary ground element is configured not to have electrical connections to the ground plane of the laptop. In another implementation, a solid state switch selectively connects an antenna parasitic element to the main ground thus enabling selective control of the antenna lower frequency operating band.

32 Claims, 11 Drawing Sheets

(56) References Cited

U.S. PATENT DOCUMENTS

| | | |
|---|---|---|
| 4,706,050 A | 11/1987 | Andrews |
| 4,716,391 A | 12/1987 | Moutrie et al. |
| 4,740,765 A | 4/1988 | Ishikawa et al. |
| 4,742,562 A | 5/1988 | Kommrusch |
| 4,761,624 A | 8/1988 | Igarashi et al. |
| 4,800,348 A | 1/1989 | Rosar et al. |
| 4,800,392 A | 1/1989 | Garay et al. |
| 4,821,006 A | 4/1989 | Ishikawa et al. |
| 4,823,098 A | 4/1989 | DeMuro et al. |
| 4,827,266 A | 5/1989 | Sato et al. |
| 4,829,274 A | 5/1989 | Green et al. |
| 4,862,181 A | 8/1989 | PonceDeLeon et al. |
| 4,879,533 A | 11/1989 | De Muro et al. |
| 4,896,124 A | 1/1990 | Schwent |
| 4,954,796 A | 9/1990 | Green et al. |
| 4,965,537 A | 10/1990 | Kommrusch |
| 4,977,383 A | 12/1990 | Niiranen |
| 4,980,694 A | 12/1990 | Hines |
| 5,017,932 A | 5/1991 | Ushiyama et al. |
| 5,047,739 A | 9/1991 | Kuokkanen |
| 5,053,786 A | 10/1991 | Silverman et al. |
| 5,097,236 A | 3/1992 | Wakino et al. |
| 5,103,197 A | 4/1992 | Turunen |
| 5,109,536 A | 4/1992 | Kommrusch |
| 5,155,493 A | 10/1992 | Thursby et al. |
| 5,157,363 A | 10/1992 | Puurunen |
| 5,159,303 A | 10/1992 | Flink |
| 5,166,697 A | 11/1992 | Viladevall et al. |
| 5,170,173 A | 12/1992 | Krenz et al. |
| 5,203,021 A | 4/1993 | Repplinger et al. |
| 5,210,510 A | 5/1993 | Karsikas |
| 5,210,542 A | 5/1993 | Pett et al. |
| 5,220,335 A | 6/1993 | Huang |
| 5,229,777 A | 7/1993 | Doyle |
| 5,239,279 A | 8/1993 | Turunen |
| 5,278,528 A | 1/1994 | Turunen |
| 5,281,326 A | 1/1994 | Galla |
| 5,298,873 A | 3/1994 | Ala-Kojola |
| 5,302,924 A | 4/1994 | Jantunen |
| 5,304,968 A | 4/1994 | Ohtonen |
| 5,307,036 A | 4/1994 | Turunen |
| 5,319,328 A | 6/1994 | Turunen |
| 5,349,315 A | 9/1994 | Ala-Kojola |
| 5,349,700 A | 9/1994 | Parker |
| 5,351,023 A | 9/1994 | Niiranen |
| 5,354,463 A | 10/1994 | Turunen |
| 5,355,142 A | 10/1994 | Marshall et al. |
| 5,357,262 A | 10/1994 | Blaese |
| 5,363,114 A | 11/1994 | Shoemaker |
| 5,369,782 A | 11/1994 | Kawano et al. |
| 5,382,959 A | 1/1995 | Pett et al. |
| 5,386,214 A | 1/1995 | Sugawara |
| 5,387,886 A | 2/1995 | Takalo |
| 5,394,162 A | 2/1995 | Korovesis et al. |
| RE34,898 E | 4/1995 | Turunen |
| 5,408,206 A | 4/1995 | Turunen |
| 5,418,508 A | 5/1995 | Puurunen |
| 5,432,489 A | 7/1995 | Yrjola |
| 5,438,697 A | 8/1995 | Fowler et al. |
| 5,440,315 A | 8/1995 | Wright et al. |
| 5,442,366 A | 8/1995 | Sanford |
| 5,444,453 A | 8/1995 | Lalezari |
| 5,467,065 A | 11/1995 | Turunen |
| 5,473,295 A | 12/1995 | Turunen |
| 5,506,554 A | 4/1996 | Ala-Kojola |
| 5,508,668 A | 4/1996 | Prokkola |
| 5,517,683 A | 5/1996 | Collett et al. |
| 5,521,561 A | 5/1996 | Yrjola |
| 5,532,703 A | 7/1996 | Stephens et al. |
| 5,541,560 A | 7/1996 | Turunen |
| 5,541,617 A | 7/1996 | Connolly et al. |
| 5,543,764 A | 8/1996 | Turunen |
| 5,550,519 A | 8/1996 | Korpela |
| 5,557,287 A | 9/1996 | Pottala et al. |
| 5,557,292 A | 9/1996 | Nygren et al. |
| 5,570,071 A | 10/1996 | Ervasti |
| 5,585,771 A | 12/1996 | Ervasti |
| 5,585,810 A | 12/1996 | Tsuru et al. |
| 5,589,844 A | 12/1996 | Belcher et al. |
| 5,594,395 A | 1/1997 | Niiranen |
| 5,604,471 A | 2/1997 | Rattila |
| 5,627,502 A | 5/1997 | Ervasti |
| 5,649,316 A | 7/1997 | Prudhomme et al. |
| 5,668,561 A | 9/1997 | Perrotta et al. |
| 5,675,301 A | 10/1997 | Nappa |
| 5,689,221 A | 11/1997 | Niiranen |
| 5,694,135 A | 12/1997 | Dikun et al. |
| 5,703,600 A | 12/1997 | Burrell et al. |
| 5,709,832 A | 1/1998 | Hayes et al. |
| 5,711,014 A | 1/1998 | Crowley et al. |
| 5,717,368 A | 2/1998 | Niiranen |
| 5,731,749 A | 3/1998 | Yrjola |
| 5,734,305 A | 3/1998 | Ervasti |
| 5,734,350 A | 3/1998 | Deming et al. |
| 5,734,351 A | 3/1998 | Ojantakanen |
| 5,739,735 A | 4/1998 | Pyykko |
| 5,742,259 A | 4/1998 | Annamaa |
| 5,757,327 A | 5/1998 | Yajima et al. |
| 5,764,190 A | 6/1998 | Murch et al. |
| 5,767,809 A | 6/1998 | Chuang et al. |
| 5,768,217 A | 6/1998 | Sonoda et al. |
| 5,777,581 A | 7/1998 | Lilly et al. |
| 5,777,585 A | 7/1998 | Tsuda et al. |
| 5,793,269 A | 8/1998 | Ervasti |
| 5,812,094 A | 9/1998 | Maldonado |
| 5,815,048 A | 9/1998 | Ala-Kojola |
| 5,822,705 A | 10/1998 | Lehtola |
| 5,852,421 A | 12/1998 | Maldonado |
| 5,861,854 A | 1/1999 | Kawahata et al. |
| 5,874,926 A | 2/1999 | Tsuru et al. |
| 5,880,697 A | 3/1999 | McCarrick et al. |
| 5,886,668 A | 3/1999 | Pedersen et al. |
| 5,892,490 A | 4/1999 | Asakura et al. |
| 5,903,820 A | 5/1999 | Hagstrom |
| 5,905,475 A | 5/1999 | Annamaa |
| 5,920,290 A | 7/1999 | McDonough et al. |
| 5,926,139 A | 7/1999 | Korisch |
| 5,929,813 A | 7/1999 | Eggleston |
| 5,936,583 A | 8/1999 | Sekine et al. |
| 5,943,016 A | 8/1999 | Snyder, Jr. et al. |
| 5,952,975 A | 9/1999 | Pedersen et al. |
| 5,959,583 A | 9/1999 | Funk |
| 5,963,180 A | 10/1999 | Leisten |
| 5,966,097 A | 10/1999 | Fukasawa et al. |
| 5,970,393 A | 10/1999 | Khorrami et al. |
| 5,977,710 A | 11/1999 | Kuramoto et al. |
| 5,986,606 A | 11/1999 | Kossiavas et al. |
| 5,986,608 A | 11/1999 | Korisch et al. |
| 5,990,848 A | 11/1999 | Annamaa |
| 5,999,132 A | 12/1999 | Kitchener et al. |
| 6,005,529 A | 12/1999 | Hutchinson |
| 6,006,419 A | 12/1999 | Vandendolder et al. |
| 6,008,764 A | 12/1999 | Ollikainen |
| 6,009,311 A | 12/1999 | Killion et al. |
| 6,014,106 A | 1/2000 | Annamaa |
| 6,016,130 A | 1/2000 | Annamaa |
| 6,023,608 A | 2/2000 | Yrjola |
| 6,031,496 A | 2/2000 | Kuittinen et al. |
| 6,034,637 A | 3/2000 | McCoy et al. |
| 6,037,848 A | 3/2000 | Alila |
| 6,043,780 A | 3/2000 | Funk et al. |
| 6,072,434 A | 6/2000 | Papatheodorou |
| 6,078,231 A | 6/2000 | Pelkonen |
| 6,091,363 A | 7/2000 | Komatsu et al. |
| 6,097,345 A | 8/2000 | Walton |
| 6,100,849 A | 8/2000 | Tsubaki et al. |
| 6,112,108 A | 8/2000 | Tepper et al. |
| 6,133,879 A | 10/2000 | Grangeat et al. |
| 6,134,421 A | 10/2000 | Lee et al. |
| 6,140,973 A | 10/2000 | Annamaa |
| 6,147,650 A | 11/2000 | Kawahata et al. |
| 6,157,819 A | 12/2000 | Vuokko |
| 6,177,908 B1 | 1/2001 | Kawahata |
| 6,185,434 B1 | 2/2001 | Hagstrom |

(56) References Cited

U.S. PATENT DOCUMENTS

| | | |
|---|---|---|
| 6,190,942 B1 | 2/2001 | Wilm et al. |
| 6,195,049 B1 | 2/2001 | Kim et al. |
| 6,204,826 B1 | 3/2001 | Rutkowski et al. |
| 6,215,376 B1 | 4/2001 | Hagstrom |
| 6,246,368 B1 | 6/2001 | Deming et al. |
| 6,252,552 B1 | 6/2001 | Tarvas et al. |
| 6,252,554 B1 | 6/2001 | Isohatala |
| 6,255,994 B1 | 7/2001 | Saito |
| 6,268,831 B1 | 7/2001 | Sanford |
| 6,295,029 B1 | 9/2001 | Chen et al. |
| 6,297,776 B1 | 10/2001 | Pankinaho |
| 6,304,220 B1 | 10/2001 | Herve et al. |
| 6,308,720 B1 | 10/2001 | Modi |
| 6,316,975 B1 | 11/2001 | O'Toole et al. |
| 6,323,811 B1 | 11/2001 | Tsubaki |
| 6,326,921 B1 | 12/2001 | Egorov et al. |
| 6,337,663 B1 | 1/2002 | Chi-Ming |
| 6,340,954 B1 | 1/2002 | Annamaa et al. |
| 6,342,859 B1 | 1/2002 | Kurz et al. |
| 6,346,914 B1 | 2/2002 | Annamaa |
| 6,348,892 B1 | 2/2002 | Annamaa |
| 6,353,443 B1 | 3/2002 | Ying |
| 6,366,243 B1 | 4/2002 | Isohatala |
| 6,377,827 B1 | 4/2002 | Rydbeck |
| 6,380,905 B1 | 4/2002 | Annamaa et al. |
| 6,396,444 B1 | 5/2002 | Goward |
| 6,404,394 B1 | 6/2002 | Hill |
| 6,417,813 B1 | 7/2002 | Durham |
| 6,423,915 B1 | 7/2002 | Winter |
| 6,429,818 B1 | 8/2002 | Johnson et al. |
| 6,452,551 B1 | 9/2002 | Chen |
| 6,452,558 B1 | 9/2002 | Saitou et al. |
| 6,456,249 B1 | 9/2002 | Johnson et al. |
| 6,459,413 B1 | 10/2002 | Tseng et al. |
| 6,462,716 B1 | 10/2002 | Kushihi |
| 6,469,673 B2 | 10/2002 | Kaiponen |
| 6,473,056 B2 | 10/2002 | Annamaa |
| 6,476,769 B1 | 11/2002 | Lehtola |
| 6,480,155 B1 | 11/2002 | Eggleston |
| 6,501,425 B1 | 12/2002 | Nagumo |
| 6,518,925 B1 | 2/2003 | Annamaa |
| 6,529,168 B2 | 3/2003 | Mikkola |
| 6,535,170 B2 | 3/2003 | Sawamura et al. |
| 6,538,604 B1 | 3/2003 | Isohatala |
| 6,549,167 B1 | 4/2003 | Yoon |
| 6,556,812 B1 | 4/2003 | Pennanen et al. |
| 6,566,944 B1 | 5/2003 | Pehlke |
| 6,580,396 B2 | 6/2003 | Lin |
| 6,580,397 B2 | 6/2003 | Lindell |
| 6,600,449 B2 | 7/2003 | Onaka |
| 6,603,430 B1 | 8/2003 | Hill et al. |
| 6,606,016 B2 | 8/2003 | Takamine et al. |
| 6,611,235 B2 | 8/2003 | Barna et al. |
| 6,614,400 B2 | 9/2003 | Egorov |
| 6,614,405 B1 | 9/2003 | Mikkonen |
| 5,442,280 A1 | 10/2003 | Johnson |
| 6,634,564 B2 | 10/2003 | Kuramochi |
| 6,636,181 B2 | 10/2003 | Asano |
| 6,639,564 B2 | 10/2003 | Johnson |
| 6,646,606 B2 | 11/2003 | Mikkola |
| 6,650,295 B2 | 11/2003 | Ollikainen et al. |
| 6,657,593 B2 | 12/2003 | Nagumo et al. |
| 6,657,595 B1 | 12/2003 | Phillips et al. |
| 6,670,926 B2 | 12/2003 | Miyasaka |
| 6,677,903 B2 | 1/2004 | Wang |
| 6,683,573 B2 | 1/2004 | Park |
| 6,693,594 B2 | 2/2004 | Pankinaho et al. |
| 6,717,551 B2 | 4/2004 | Desclos et al. |
| 6,727,857 B2 | 4/2004 | Mikkola |
| 6,734,825 B1 | 5/2004 | Guo et al. |
| 6,734,826 B1 | 5/2004 | Dai et al. |
| 6,738,022 B2 | 5/2004 | Klaavo et al. |
| 6,741,214 B1 | 5/2004 | Kadambi et al. |
| 6,753,813 B2 | 6/2004 | Kushihi |
| 6,759,989 B2 | 7/2004 | Tarvas et al. |
| 6,765,536 B2 | 7/2004 | Phillips et al. |
| 6,774,853 B2 | 8/2004 | Wong et al. |
| 6,781,545 B2 | 8/2004 | Sung |
| 6,801,166 B2 | 10/2004 | Mikkola |
| 6,801,169 B1 | 10/2004 | Chang et al. |
| 6,806,835 B2 | 10/2004 | Iwai |
| 6,819,287 B2 | 11/2004 | Sullivan et al. |
| 6,819,293 B2 | 11/2004 | Johannes et al. |
| 6,825,818 B2 | 11/2004 | Toncich |
| 6,836,249 B2 | 12/2004 | Kenoun et al. |
| 6,847,329 B2 | 1/2005 | Ikegaya et al. |
| 6,856,293 B2 | 2/2005 | Bordi |
| 6,862,437 B1 | 3/2005 | McNamara |
| 6,862,441 B2 | 3/2005 | Ella |
| 6,873,291 B2 | 3/2005 | Aoyama |
| 6,876,329 B2 | 4/2005 | Milosavljevic |
| 6,882,317 B2 | 4/2005 | Koskiniemi |
| 6,891,507 B2 | 5/2005 | Kushihi et al. |
| 6,897,810 B2 | 5/2005 | Dai et al. |
| 6,900,768 B2 | 5/2005 | Iguchi et al. |
| 6,903,692 B2 | 6/2005 | Kivekas |
| 6,911,945 B2 | 6/2005 | Korva |
| 6,922,171 B2 | 7/2005 | Annamaa |
| 6,925,689 B2 | 8/2005 | Folkmar |
| 6,927,729 B2 | 8/2005 | Legay |
| 6,937,196 B2 | 8/2005 | Korva |
| 6,950,066 B2 | 9/2005 | Hendler et al. |
| 6,950,068 B2 | 9/2005 | Bordi |
| 6,952,144 B2 | 10/2005 | Javor |
| 6,952,187 B2 | 10/2005 | Annamaa |
| 6,958,730 B2 | 10/2005 | Nagumo et al. |
| 6,961,544 B1 | 11/2005 | Hagstrom |
| 6,963,308 B2 | 11/2005 | Korva |
| 6,963,310 B2 | 11/2005 | Horita et al. |
| 6,967,618 B2 | 11/2005 | Ojantakanen |
| 6,975,278 B2 | 12/2005 | Song et al. |
| 6,985,108 B2 | 1/2006 | Mikkola |
| 6,992,543 B2 | 1/2006 | Luetzelschwab et al. |
| 6,995,710 B2 | 2/2006 | Sugimoto et al. |
| 7,023,341 B2 | 4/2006 | Stilp |
| 7,031,744 B2 | 4/2006 | Kuriyama et al. |
| 7,042,403 B2 | 5/2006 | Colburn et al. |
| 7,053,841 B2 | 5/2006 | Ponce De Leon et al. |
| 7,054,671 B2 | 5/2006 | Kaiponen et al. |
| 7,057,560 B2 | 6/2006 | Erkocevic |
| 7,081,857 B2 | 7/2006 | Kinnunen et al. |
| 7,084,831 B2 | 8/2006 | Takagi et al. |
| 7,099,690 B2 | 8/2006 | Milosavljevic |
| 7,113,133 B2 | 9/2006 | Chen et al. |
| 7,119,749 B2 | 10/2006 | Miyata et al. |
| 7,126,546 B2 | 10/2006 | Annamaa |
| 7,136,019 B2 | 11/2006 | Mikkola |
| 7,136,020 B2 | 11/2006 | Yamaki |
| 7,142,824 B2 | 11/2006 | Kojima et al. |
| 7,148,847 B2 | 12/2006 | Yuanzhu |
| 7,148,849 B2 | 12/2006 | Lin |
| 7,148,851 B2 | 12/2006 | Takaki et al. |
| 7,170,464 B2 | 1/2007 | Tang et al. |
| 7,176,838 B1 | 2/2007 | Kinezos |
| 7,180,455 B2 | 2/2007 | Oh et al. |
| 7,193,574 B2 | 3/2007 | Chiang et al. |
| 7,205,942 B2 | 4/2007 | Wang et al. |
| 7,218,280 B2 | 5/2007 | Annamaa |
| 7,218,282 B2 | 5/2007 | Humpfer et al. |
| 7,224,313 B2 | 5/2007 | McKinzie, III et al. |
| 7,230,574 B2 | 6/2007 | Johnson |
| 7,237,318 B2 | 7/2007 | Annamaa |
| 7,256,743 B2 | 8/2007 | Korva |
| 7,274,334 B2 | 9/2007 | O'Riordan et al. |
| 7,283,097 B2 | 10/2007 | Wen et al. |
| 7,289,064 B2 | 10/2007 | Cheng |
| 7,292,200 B2 | 11/2007 | Posluszny et al. |
| 7,319,432 B2 | 1/2008 | Andersson |
| 7,330,153 B2 | 2/2008 | Rentz |
| 7,333,067 B2 | 2/2008 | Hung et al. |
| 7,339,528 B2 | 3/2008 | Wang et al. |
| 7,340,286 B2 | 3/2008 | Korva et al. |
| 7,345,634 B2 | 3/2008 | Ozkar et al. |
| 7,352,326 B2 | 4/2008 | Korva |

(56) References Cited

U.S. PATENT DOCUMENTS

| | | |
|---|---|---|
| 7,358,902 B2 | 4/2008 | Erkocevic |
| 7,382,319 B2 | 6/2008 | Kawahata et al. |
| 7,385,556 B2 | 6/2008 | Chung et al. |
| 7,388,543 B2 | 6/2008 | Vance |
| 7,391,378 B2 | 6/2008 | Mikkola |
| 7,405,702 B2 | 7/2008 | Annamaa et al. |
| 7,417,588 B2 | 8/2008 | Castany et al. |
| 7,423,592 B2 | 9/2008 | Pros et al. |
| 7,432,860 B2 | 10/2008 | Huynh |
| 7,439,929 B2 | 10/2008 | Ozkar |
| 7,468,700 B2 | 12/2008 | Milosavlejevic |
| 7,468,709 B2 | 12/2008 | Niemi |
| 7,498,990 B2 | 3/2009 | Park et al. |
| 7,501,983 B2 | 3/2009 | Mikkola |
| 7,502,598 B2 | 3/2009 | Kronberger |
| 7,589,678 B2 | 9/2009 | Perunka |
| 7,616,158 B2 | 11/2009 | Mark et al. |
| 7,633,449 B2 | 12/2009 | Oh |
| 7,663,551 B2 | 2/2010 | Nissinen |
| 7,679,565 B2 | 3/2010 | Sorvala |
| 7,692,543 B2 | 4/2010 | Copeland |
| 7,710,325 B2 | 5/2010 | Cheng |
| 7,724,204 B2 | 5/2010 | Annamaa |
| 7,760,146 B2 | 7/2010 | Ollikainen |
| 7,764,245 B2 | 7/2010 | Loyet |
| 7,786,938 B2 | 8/2010 | Sorvala |
| 7,800,544 B2 | 9/2010 | Thornell-Pers |
| 7,830,327 B2 | 11/2010 | He |
| 7,889,139 B2 | 2/2011 | Hobson et al. |
| 7,889,143 B2 | 2/2011 | Milosavljevic |
| 7,901,617 B2 | 3/2011 | Taylor |
| 7,916,086 B2 | 3/2011 | Koskiniemi et al. |
| 7,963,347 B2 | 6/2011 | Pabon |
| 7,973,720 B2 | 7/2011 | Sorvala |
| 8,049,670 B2 | 11/2011 | Jung et al. |
| 8,179,322 B2 | 5/2012 | Nissinen |
| 2001/0050636 A1 | 12/2001 | Weinberger |
| 2002/0183013 A1 | 12/2002 | Auckland et al. |
| 2002/0196192 A1 | 12/2002 | Nagumo et al. |
| 2003/0146873 A1 | 8/2003 | Blancho |
| 2004/0090378 A1 | 5/2004 | Dai et al. |
| 2004/0145525 A1 | 7/2004 | Annabi et al. |
| 2004/0171403 A1 | 9/2004 | Mikkola |
| 2005/0057401 A1 | 3/2005 | Yuanzhu |
| 2005/0134518 A1* | 6/2005 | Zimmerman et al. ......... 343/844 |
| 2005/0159131 A1 | 7/2005 | Shibagaki et al. |
| 2005/0176481 A1 | 8/2005 | Jeong |
| 2006/0071857 A1 | 4/2006 | Pelzer |
| 2006/0192723 A1 | 8/2006 | Harada |
| 2007/0042615 A1 | 2/2007 | Liao |
| 2007/0082789 A1 | 4/2007 | Nissila |
| 2007/0152881 A1 | 7/2007 | Chan |
| 2007/0188388 A1 | 8/2007 | Feng |
| 2008/0055164 A1 | 3/2008 | Zhang et al. |
| 2008/0059106 A1 | 3/2008 | Wight |
| 2008/0088511 A1 | 4/2008 | Sorvala |
| 2008/0106481 A1* | 5/2008 | Lin et al. ............ 343/793 |
| 2008/0158065 A1* | 7/2008 | Wee ............ 343/700 MS |
| 2008/0180333 A1* | 7/2008 | Martiskainen et al. ....... 343/722 |
| 2008/0266199 A1 | 10/2008 | Milosavljevic |
| 2009/0009415 A1 | 1/2009 | Tanska |
| 2009/0135066 A1 | 5/2009 | Raappana et al. |
| 2009/0167622 A1* | 7/2009 | Yanagisawa et al. ......... 343/772 |
| 2009/0174604 A1 | 7/2009 | Keskitalo |
| 2009/0196160 A1 | 8/2009 | Crombach |
| 2009/0197654 A1 | 8/2009 | Teshima |
| 2009/0231213 A1 | 9/2009 | Ishimiya |
| 2010/0220016 A1 | 9/2010 | Nissinen |
| 2010/0244978 A1 | 9/2010 | Milosavljevic |
| 2010/0309092 A1 | 12/2010 | Lambacka |
| 2011/0102290 A1 | 5/2011 | Milosavljevic |
| 2011/0133994 A1 | 6/2011 | Korva |
| 2011/0241951 A1* | 10/2011 | Sakamoto et al. ............ 343/702 |
| 2012/0119955 A1 | 5/2012 | Milosavljevic |

FOREIGN PATENT DOCUMENTS

| | | |
|---|---|---|
| DE | 10104862 | 8/2002 |
| DE | 101 50 149 A1 | 4/2003 |
| EP | 0208424 | 1/1987 |
| EP | 0278069 | 8/1988 |
| EP | 0279050 | 8/1988 |
| EP | 0339822 | 3/1989 |
| EP | 0 332 139 | 9/1989 |
| EP | 0 376 643 A2 | 4/1990 |
| EP | 0383292 | 8/1990 |
| EP | 0399975 | 12/1990 |
| EP | 0400872 | 12/1990 |
| EP | 0401839 | 9/1991 |
| EP | 0447218 | 9/1994 |
| EP | 0615285 | 10/1994 |
| EP | 0621653 | 2/1995 |
| EP | 0 749 214 | 12/1996 |
| EP | 0637094 | 1/1997 |
| EP | 0 759 646 A1 | 2/1997 |
| EP | 0 766 341 | 2/1997 |
| EP | 0 766 340 | 4/1997 |
| EP | 0751043 | 4/1997 |
| EP | 0807988 | 11/1997 |
| EP | 0 831 547 A2 | 3/1998 |
| EP | 0851530 | 7/1998 |
| EP | 0856907 | 8/1998 |
| EP | 1 294 048 | 1/1999 |
| EP | 0892459 | 1/1999 |
| EP | 0766339 | 2/1999 |
| EP | 0 942 488 A2 | 9/1999 |
| EP | 1 003 240 A2 | 5/2000 |
| EP | 1006605 | 6/2000 |
| EP | 1006606 | 6/2000 |
| EP | 1014487 | 6/2000 |
| EP | 1024553 | 8/2000 |
| EP | 1026774 | 8/2000 |
| EP | 0999607 | 10/2000 |
| EP | 1 052 723 | 11/2000 |
| EP | 1052722 | 11/2000 |
| EP | 1 063 722 A2 | 12/2000 |
| EP | 1067627 | 1/2001 |
| EP | 1094545 | 4/2001 |
| EP | 1 102 348 | 5/2001 |
| EP | 1098387 | 5/2001 |
| EP | 1 113 524 | 7/2001 |
| EP | 1113524 | 7/2001 |
| EP | 1 128 466 A2 | 8/2001 |
| EP | 1 139 490 | 10/2001 |
| EP | 1 146 589 | 10/2001 |
| EP | 1 162 688 | 12/2001 |
| EP | 1162688 | 12/2001 |
| EP | 0993070 | 4/2002 |
| EP | 1 248 316 | 9/2002 |
| EP | 0923158 | 9/2002 |
| EP | 1 267 441 | 12/2002 |
| EP | 1271690 | 1/2003 |
| EP | 1 294 049 A1 | 3/2003 |
| EP | 1306922 | 5/2003 |
| EP | 1 329 980 | 7/2003 |
| EP | 1 351 334 | 8/2003 |
| EP | 1 361 623 | 11/2003 |
| EP | 1248316 | 1/2004 |
| EP | 1396906 | 3/2004 |
| EP | 1 406 345 | 4/2004 |
| EP | 1 414 108 | 4/2004 |
| EP | 1 432 072 | 6/2004 |
| EP | 1 437 793 | 7/2004 |
| EP | 1439603 | 7/2004 |
| EP | 1 445 822 | 8/2004 |
| EP | 1 453 137 | 9/2004 |
| EP | 1 469 549 | 10/2004 |
| EP | 1220456 | 10/2004 |
| EP | 1467456 | 10/2004 |
| EP | 1 482 592 | 12/2004 |
| EP | 1 498 984 | 1/2005 |
| EP | 1 564 839 | 1/2005 |
| EP | 1170822 | 4/2005 |
| EP | 1 544 943 | 6/2005 |

(56) References Cited

FOREIGN PATENT DOCUMENTS

| | | |
|---|---|---|
| EP | 1753079 | 2/2007 |
| EP | 1 791 213 | 5/2007 |
| EP | 1843432 | 10/2007 |
| FI | 20020829 | 11/2003 |
| FI | 118782 B1 | 3/2008 |
| FR | 2553584 | 10/1983 |
| FR | 2724274 | 3/1996 |
| FR | 2873247 | 1/2006 |
| GB | 2266997 | 11/1993 |
| GB | 2 360 422 A | 9/2001 |
| GB | 239246 | 12/2003 |
| JP | 1984202831 | 11/1984 |
| JP | 600206304 | 10/1985 |
| JP | 1986245704 | 11/1986 |
| JP | 06152463 | 5/1994 |
| JP | 1995131234 | 5/1995 |
| JP | 1995221536 | 8/1995 |
| JP | 7249923 | 9/1995 |
| JP | 1995307612 | 11/1995 |
| JP | 08216571 | 8/1996 |
| JP | 09083242 | 3/1997 |
| JP | 9260934 | 10/1997 |
| JP | 9307344 | 11/1997 |
| JP | 10 028013 | 1/1998 |
| JP | 10107671 | 4/1998 |
| JP | 10173423 | 6/1998 |
| JP | 10 209733 | 8/1998 |
| JP | 10224142 | 8/1998 |
| JP | 10 327011 | 12/1998 |
| JP | 10322124 | 12/1998 |
| JP | 11 004117 | 1/1999 |
| JP | 1999004113 | 1/1999 |
| JP | 11 068456 | 3/1999 |
| JP | 11127010 | 5/1999 |
| JP | 11136025 | 5/1999 |
| JP | 199127014 | 5/1999 |
| JP | 11 355033 | 12/1999 |
| JP | 2000278028 | 10/2000 |
| JP | 200153543 | 2/2001 |
| JP | 2001267833 | 9/2001 |
| JP | 2001217631 | 10/2001 |
| JP | 2001326513 | 11/2001 |
| JP | 2002319811 A | 10/2002 |
| JP | 2002329541 | 11/2002 |
| JP | 2002335117 | 11/2002 |
| JP | 200360417 | 2/2003 |
| JP | 2003124730 | 4/2003 |
| JP | 2003179426 | 6/2003 |
| JP | 2003318638 | 11/2003 |
| JP | 2004112028 | 4/2004 |
| JP | 2004363859 | 12/2004 |
| JP | 2005005985 | 1/2005 |
| JP | 2005252661 | 9/2005 |
| KR | 20010080521 | 10/2001 |
| KR | 10-2006-7027462 | 12/2002 |
| KR | 20020096016 | 12/2002 |
| SE | 511900 | 12/1999 |
| WO | WO 92/00635 | 1/1992 |
| WO | WO 96/27219 | 9/1996 |
| WO | WO 98/01919 | 1/1998 |
| WO | WO 98/01921 | 1/1998 |
| WO | WO 98/37592 | 8/1998 |
| WO | WO 99/30479 | 6/1999 |
| WO | WO 00/36700 | 6/2000 |
| WO | WO 01/20718 | 3/2001 |
| WO | WO 01/24316 | 4/2001 |
| WO | WO 01/28035 | 4/2001 |
| WO | WO 01/29927 | 4/2001 |
| WO | WO 01/33665 | 5/2001 |
| WO | WO 01/61781 | 8/2001 |
| WO | WO 01/91236 | 11/2001 |
| WO | WO 02/08672 | 1/2002 |
| WO | WO 02/11236 A1 | 2/2002 |
| WO | WO 02/13307 | 2/2002 |
| WO | WO 02/41443 | 5/2002 |
| WO | WO 02/067375 | 8/2002 |
| WO | WO 02/078123 | 10/2002 |
| WO | WO 02/078124 | 10/2002 |
| WO | WO 03/094290 | 11/2003 |
| WO | WO 2004/017462 | 2/2004 |
| WO | WO 2004/036778 | 4/2004 |
| WO | WO 2004/057697 | 7/2004 |
| WO | WO 2004/070872 | 8/2004 |
| WO | WO 2004/100313 | 11/2004 |
| WO | WO 2004/112189 A | 12/2004 |
| WO | WO 2005/011055 | 2/2005 |
| WO | WO 2005/018045 | 2/2005 |
| WO | WO 2005/034286 | 4/2005 |
| WO | WO 2005/038981 A1 | 4/2005 |
| WO | WO 2005/055364 | 6/2005 |
| WO | WO 2005/062416 | 7/2005 |
| WO | WO 2006/000631 A1 | 1/2006 |
| WO | WO 2006/000650 | 1/2006 |
| WO | WO 2006/051160 A1 | 5/2006 |
| WO | WO 2006/084951 A1 | 8/2006 |
| WO | WO 2006/097567 | 9/2006 |
| WO | WO 2007/000483 | 1/2007 |
| WO | WO 2007/000483 A1 | 1/2007 |
| WO | WO 2007/012697 | 2/2007 |
| WO | WO 2007/039667 | 4/2007 |
| WO | WO 2007/039668 | 4/2007 |
| WO | WO 2007/042614 | 4/2007 |
| WO | WO 2007/042615 | 4/2007 |
| WO | WO 2007/050600 | 5/2007 |
| WO | WO 2007/080214 | 7/2007 |
| WO | WO 2007/098810 | 9/2007 |
| WO | WO 2007/138157 | 12/2007 |
| WO | WO 2008/059106 | 3/2008 |
| WO | WO 2008/129125 | 10/2008 |
| WO | WO 2009/027579 | 5/2009 |
| WO | WO 2009/095531 | 8/2009 |
| WO | WO 2009/106682 | 9/2009 |
| WO | WO 2010/122220 | 10/2010 |

OTHER PUBLICATIONS

"Dual Band Antenna for Hand Held Portable Telephones", Liu et al., Electronics Letters, vol, 32, No. 7, 1996, pp. 609-610.

"Improved Bandwidth of Microstrip Antennas using Parasitic Elements," IEE Proc. vol. 127, Pt. H. No. 4, Aug. 1980.

"A 13.56MHz RFID Device and Software for Mobile Systems", by H. Ryoson, et al., Micro Systems Network Co., 2004 IEEE, pp. 241-244.

"A Novel Approach of a Planar Multi-Band Hybrid Series Feed Network for Use in Antenna Systems Operating at Millimeter Wave Frequencies," by M.W. Elsallal and B.L. Hauck, Rockwell Collins, Inc., 2003 pp. 15-24, waelsall@rockwellcollins.com and blhauck@rockwellcollins.com.

Abedin, M. F. and M. Ali, "Modifying the ground plane and its erect on planar inverted-F antennas (PIFAs) for mobile handsets," *IEEE Antennas and Wireless Propagation Letters*, vol. 2, 226-229, 2003.

C. R. Rowell and R. D. Murch, "A compact PIFA suitable for dual frequency 900/1800-MHz operation," *IEEE Trans. Antennas Propag.*, vol. 46, No. 4, pp. 596-598, Apr. 1998.

Cheng- Nan Hu, Willey Chen, and Book Tai, "A Compact Multi-Band Antenna Design for Mobile Handsets", *APMC 2005 Proceedings*.

Endo, T., Y. Sunahara, S. Satoh and T. Katagi, "Resonant Frequency and Radiation Efficiency of Meander Line Antennas," Electronics and Commu-nications in Japan, Part 2, vol. 83, No. 1, 52-58, 2000.

European Office Action, May 30, 2005 issued during prosecution of EP 04 396 001.2-1248.

Examination Report dated May 3, 2006 issued by the EPO for European Patent Application No. 04 396 079.8.

F.R. Hsiao, et al. "A dual-band planar inverted-F patch antenna with a branch-line slit," *Microwave Opt. Technol. Lett.*, vol. 32, Feb. 20, 2002.

Griffin, Donald W. et al., "Electromagnetic Design Aspects of Packages for Monolithic Microwave Integrated Circuit-Based Arrays with Integrated Antenna Elements", IEEE Transactions on Antennas and Propagation, vol. 43, No. 9, pp. 927-931, Sep. 1995.

(56) References Cited

OTHER PUBLICATIONS

Guo, Y. X. and H. S. Tan, "New compact six-band internal antenna," *IEEE Antennas and Wireless Propagation Letters*, vol. 3, 295-297, 2004.
Guo, Y. X. and Y.W. Chia and Z. N. Chen, "Miniature built-in quadband antennas for mobile handsets", *IEEE Antennas Wireless Propag. Lett.*, vol. 2, pp. 30-32, 2004.
Hoon Park, et al. "Design of an Internal antenna with wide and multiband characteristics for a mobile handset", *IEEE Microw. & Opt. Tech. Lett.* vol. 48, No. 5, May 2006.
Hoon Park, et al. "Design of Planar Inverted-F Antenna With Very Wide Impedance Bandwidth", *IEEE Microw. & Wireless Comp., Lett.*, vol. 16, No. 3, pp. 113-115-, Mar. 2006.
Hossa, R., A. Byndas, and M. E. Bialkowski, "Improvement of compact terminal antenna performance by incorporating open-end slots in ground plane," *IEEE Microwave and Wireless Components Letters*, vol. 14, 283-285, 2004.
I. Ang, Y. X. Guo, and Y. W. Chia, "Compact internal quad-band antenna for mobile phones" *Micro. Opt. Technol. Lett.*, vol. 38, No. 3 pp. 217-223 Aug. 2003.
International Preliminary Report on Patentability for International Application No. PCT/FI2004/000554, date of issuance of report May 1, 2006.
Jing, X., et al.; "Compact Planar Monopole Antenna for Multi-Band Mobile Phones"; Microwave Conference Proceedings, 4.-7.12.2005. APMC 2005, Asia-Pacific Conference Proceedings, vol. 4.
Kim, B. C., J. H. Yun, and H. D. Choi, "Small wideband PIFA for mobile phones at 1800 MHz," *IEEE International Conference on Vehicular Technology*, 27{29, Daejeon, South Korea, May 2004.
Kim, Kihong et al., "Integrated Dipole Antennas on Silicon Substrates for Intra-Chip Communication", IEEE, pp. 1582-1585, 1999.
Kivekas., O., J. Ollikainen, T. Lehtiniemi, and P. Vainikainen, "Bandwidth, SAR, and eciency of internal mobile phone antennas," *IEEE Transactions on Electromagnetic Compatibility*, vol. 46, 71{86, 2004.
K-L Wong, *Planar Antennas for Wireless Communications.*, Hoboken, NJ: Willey, 2003, ch. 2.
Lindberg., P. and E. Ojefors, "A bandwidth enhancement technique for mobile handset antennas using wavetraps," *IEEE Transactions on Antennas and Propagation*, vol. 54, 2226{2232, 2006.
Marta Martinez-Vazquez, et al., "Integrated Planar Multiband Antennas for Personal Communication Handsets", *IEEE Trasactions on Antennas and propagation*, vol. 54, No. 2, Feb. 2006.
P. Clais, et al., "Compact Internal Multiband Antennas for Mobile and WLAN Standards", *Electronic Letters*, vol. 40, No. 15, pp. 920-921, Jul. 2004.
P. Ciais, R. Staraj, G. Kossiavas, and C. Luxey, "Design of an internal quadband antenna for mobile phones", *IEEE Microwave Wireless Comp. Lett.*, vol. 14, No. 4, pp. 148-150, Apr. 2004.
P. Salonen, et al. "New slot configurations for dual-band planar inverted-F antenna," *Microwave Opt. Technol.*, vol. 28, pp. 293-298, 2001.
Papapolymerou, Ioannis et al., "Micromachined Patch Antennas", IEEE Transactions on Antennas and Propagation, vol. 46, No. 2, pp. 275-283, Feb. 1998.
Product of the Month, RFDesign, "GSM/GPRS Quad Band Power Amp Includes Antenna Switch," 1 page, reprinted Nov. 2004 issue of RF Design (www.rfdesign.com), Copyright 2004, Freescale Semiconductor, RFD-24-EK.

S. Tarvas, et al. "An internal dual-band mobile phone antenna," in *2000 IEEE Antennas Propagat. Soc. Int. Symp. Dig.*, pp. 266-269, Salt Lake City, UT, USA.
Wang, F., Z. Du, Q. Wang, and K. Gong, "Enhanced-bandwidth PIFA with T-shaped ground plane," *Electronics Letters*, vol. 40, 1504-1505, 2004.
Wang, H.; "Dual-Resonance Monopole Antenna with Tuning Stubs"; IEEE Proceedings, Microwaves, Antennas & Propagation, vol. 153, No. 4, Aug. 2006; pp. 395-399.
Wong, K., et al.; "A Low-Profile Planar Monopole Antenna for Multiband Operation of Mobile Handsets"; IEEE Transactions on Antennas and Propagation, Jan. 2003, vol. 51, No. 1.
X.-D. Cai and J.-Y. Li, Analysis of asymmetric TEM cell and its optimum design of electric field distribution, IEE Proc 136 (1989), 191-194.
X.-Q. Yang and K.-M. Huang, Study on the key problems of interaction between microwave and chemical reaction, Chin Jof Radio Sci 21 (2006), 802-809.
Chiu, C.-W., et al., "A Meandered Loop Antenna for LTE/WWAN Operations in a Smartphone," Progress in Electromagnetics Research C, vol. 16, pp. 147-160, 2010.
Lin, Sheng-Yu; Liu, Hsien-Wen; Weng, Chung-Hsun; and Yang, Chang-Fa, "A miniature Coupled loop Antenna to be Embedded in a Mobile Phone for Penta-band Applications," Progress in Electromagnetics Research Symposium Proceedings, Xi'an, China, Mar. 22-26, 2010, pp. 721-724.
Zhang, Y.Q., et al. "Band-Notched UWB Crossed Semi-Ring Monopole Antenna," Progress in Electronics Research C, vol. 19, 107-118, 2011, pp. 107-118.
Singh, Rajender, "Broadband Planar Monopole Antennas," M.Tech credit seminar report, Electronic Systems group, EE Dept, IIT Bombay, Nov. 2003, pp. 1-24.
Gobien, Andrew, T. *"Investigation of Low Profile Antenna Designs for Use in Hand-Held Radios,"* Ch.3, *The Inverted-L Antenna and Variations*; Aug. 1997, pp. 42-76.
See, C.H., et al., "Design of Planar Metal-Plate Monopole Antenna for Third Generation Mobile Handsets," Telecommunications Research Centre, Bradford University, 2005, pp. 27-30.
"LTE—an introduction," Ericsson White Paper, Jun. 2009, pp. 1-16.
"Spectrum Analysis for Future LTE Deployments," Motorola White Paper, 2007, pp. 1-8.
Chi, Yun-Wen, et al. "Quarter-Wavelength Printed Loop Antenna With an Internal Printed Matching Circuit for GSM/DCS/PCS/UMTS Operation in the Mobile Phone," IEEE Transactions on Antennas and Propagation, vol. 57, No. 9m Sep. 2009, pp. 2541-2547.
Wong, Kin-Lu, et al. "Planar Antennas for WLAN Applications," Dept. of Electrical Engineering, National Sun Yat-Sen University, Sep. 2002 Ansoft Workshop, pp. 1-45.
"$\lambda/4$ printed monopole antenna for 2.45GHz," Nordic Semiconductor, White Paper, 2005, pp. 1-6.
White, Carson, R., "Single- and Dual-Polarized Slot and Patch Antennas with Wide Tuning Ranges," The University of Michigan, 2008.
Extended European Search Report dated Jan. 30, 2013, issued by the EPO for European Patent Application No. 12177740.3.

\* cited by examiner

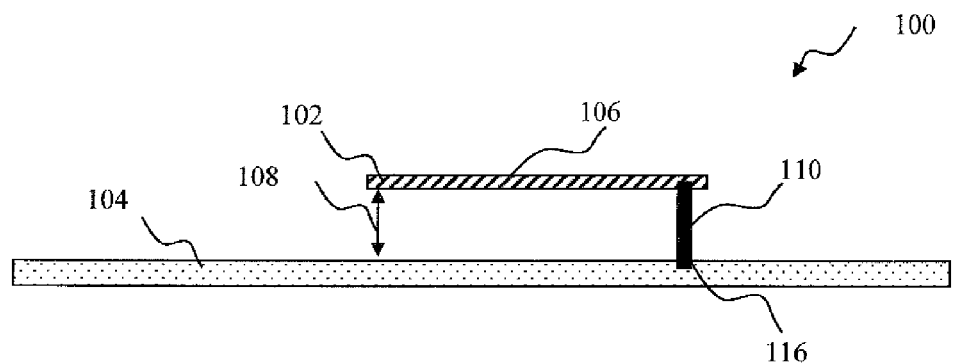
FIG. 1A - Prior art
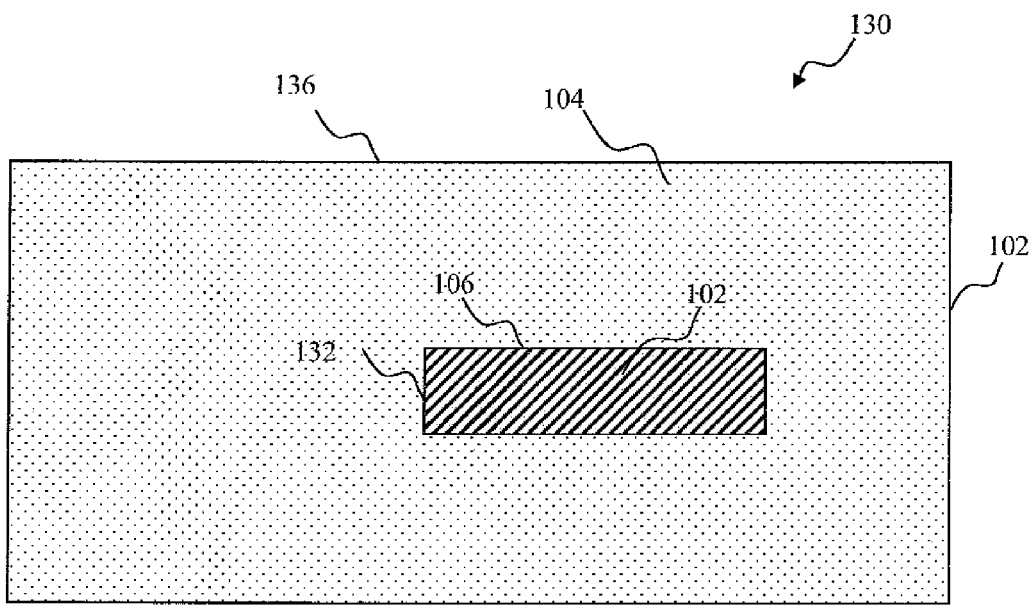
FIG. 1B - Prior art

WIDEBAND ANTENNA AND METHODS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates generally to antennas for use in wireless or portable radio devices, and more particularly in one exemplary aspect to a ground plane configuration of a multiband antenna, and methods of utilizing the same.

DESCRIPTION OF RELATED TECHNOLOGY

Internal antennas are an element found in most modern radio devices, such as mobile computers, mobile phones, Blackberry® devices, smartphones, personal digital assistants (PDAs), or other personal communication devices (PCD). Typically employed are monopole antennas that comprise a planar radiator and a ground plane parallel thereto, which are connected to each other by a short-circuit conductor in order to achieve the matching of the antenna. The structure is configured so that it functions as a resonator at the desired operating frequency.

It is also a common requirement that the antenna operate in more than one frequency band (such as dual-band, tri-band, or quad-band mobile phones), in which case two or more resonators are used.

FIG. 1A and FIG. 1B show a side elevation view 100 and a top elevation view of a typical prior art planar monopole antenna. The antenna 100 comprises a rectangular planar radiator element 102 disposed at a height 108 above a ground plane 104. The feed conductor 110 couples the planar element 102 of the antenna to the feed point 116.

In order to achieve efficient operation, the monopole radiator 102 is typically mounted over a ground plane 104 at a distance 108 as shown in FIG. 1A. Ideally, the ground plane is spread out at least a quarter wavelength, or more, around the feed-point of the antenna (as illustrated in FIG. 1B). The size of the ground plane influences the gain, resonance frequency, and impedance of the antenna. The electrical length of the radiator element mainly determines the resonant frequency of the antenna.

Typically, internal antennas are constructed to comprise at least a part of a printed wired hoard (PWB) assembly, also commonly referred to as the printed circuit board (PCB). As a result, antenna performance parameters (i.e., impedance, bandwidth, efficiency) become dependent on the size, shape, and location of the mobile device ground plane. The optimal length of an ideal monopole radiating element is a quarter of a wavelength ($\lambda$) that corresponds to the operating center frequency $f_0$ for the band of interest.

Recent advances in the development of affordable and power-efficient display technologies for mobile applications (such as liquid crystal displays (LCD), organic light-emitting diodes (LED) displays organic light emitting diodes (OLED), etc.) have resulted in a proliferation of mobile devices with screen sizes of up to 500 mm (20 inches) in some laptop computers. To achieve the best performance, LCD ground planes (or shields) are commonly used. These larger ground planes (that are required by modem displays) are no longer optimal for wireless antenna operation, however, because ground plane size plays a significant role in antenna design. As a result, antenna bandwidth is reduced due to, at least in part, impedance mismatch between antenna radiator and the ground plane. In case of a laptop, a large ground plane (that is required by a large display) significantly antenna performance optimization for a lower and an upper band simultaneously. Additionally, ground plane size and position limits antenna placement options.

Various methods are presently employed to resolve antenna-ground plane mismatch, and to improve (increase) antenna bandwidth. These typically include use of additional matching components, of multiple or hybrid antennas (for example, a loop and a monopole), etc. These methods invariably add cost and complexity, while also reducing the reliability of the antenna, as well as increasing size of the host mobile radio device.

Accordingly, there is a salient need for a wireless antenna with an increased bandwidth and efficiency as well as an improved control of antenna resonance for use in mobile radio devices, and methods of utilizing the same.

SUMMARY OF THE INVENTION

The present invention satisfies the foregoing needs by providing, inter cilia, a space-efficient antenna and methods of use.

In a first aspect of the invention, an antenna apparatus is disclosed. In one embodiment, the apparatus is for use in a portable radio device comprising a feed port and a ground plane, and the antenna apparatus comprises: a first substantially planar auxiliary ground element having a first dimension and a second dimension; and a substantially planar radiator element having a third dimension and a fourth dimension and is galvanically connected a feed point to the feed port via a feed conductor, and to the auxiliary ground element at a ground location. The auxiliary element is disposed substantially external to outside perimeters of both the ground plane the radiator element. In one variant, the first dimension is substantially perpendicular to the third dimension. In another variant, the radiator element, the auxiliary element, and the feed conductor are arranged to effect an increase in antenna bandwidth.

In another embodiment, the apparatus comprises: a monopole radiator; and a first substantially planar auxiliary ground element having a first and a second dimension. The radiator is fed at a first location via a feed conductor, and grounded at second location to the auxiliary ground element. The auxiliary element is disposed substantially external to outside perimeters of both of the ground plane and the radiator element.

In yet another embodiment, the apparatus comprises: a monopole radiator; a substantially planar auxiliary ground element having a first portion and a second portion; and a switching apparatus disposed between the ground plane and the second portion and configured to selectively connect the auxiliary ground element to ground plane. In one variant, the radiator is connect to the feed port at a first location via a feed conductor and to the first auxiliary ground element at a second location; a first projection of the auxiliary ground element is arranged substantially external to a second projection of the ground plane; and the first projection is further arranged substantially external to a third projection of the radiator.

In a second aspect of the invention, a portable radio device is disclosed. In one embodiment, the device comprises: a feed port; a ground plane; and an antenna apparatus. In one variant, the antenna apparatus comprises: a radiator; and a first substantially planar auxiliary ground element having a first and a second dimension. The radiator is coupled to the feed port at a first location via a feed conductor, and to the first auxiliary ground element at a second location; and a first projection of the first auxiliary ground element is arranged substantially external to a second projection of the ground plane. The first projection is further arranged substantially external to a third projection of the radiator.

In another variant, the radiator element comprises a first portion and a second portion, the first portion having a third dimension and a fourth dimension; and the first dimension is substantially perpendicular to the third dimension.

in yet another variant, the portable radio device is selected from the group consisting of: a) mobile computer; b) a cellular telephone; and c) a portable navigation device.

In a further variant, the auxiliary ground element is configured substantially coplanar with the ground plane.

In another embodiment, the antenna apparatus of the device comprises a substantially planar auxiliary ground element having a first portion and a second portion; and a switching apparatus disposed between the ground plane and the second portion and configured to selectively couple the auxiliary ground element to ground plane.

In a third aspect of the invention, an apparatus for use in an antenna for a radio device is disclosed. In one embodiment, the radio device comprises a ground plane, and said apparatus comprises: a monopole radiator connected to a feed conductor; and a substantially planar auxiliary ground element having a first and a second dimension, a substantially planar auxiliary ground element having a first and a second dimension, the auxiliary ground element configured to ground the radiator at a second location different than that where said radiator is configured to be fed via said feed conductor. In one variant, a projection of the auxiliary ground element is arranged substantially external to a projection of the ground plane; and the projection of the auxiliary ground is further arranged substantially external to a projection of the radiator.

In a fourth aspect of the invention, a method of tuning an antenna of a portable radio device is disclosed. In one embodiment, the method comprises providing a monopole antenna radiator and a first auxiliary ground element. The first auxiliary ground element is arranged substantially external to the ground plane and to the monopole radiator. The radiator is configured for coupling to a feed port of the radio device at a first location via a feed conductor and to the first auxiliary ground element at a second location. Tuning of the antenna is effected via configuring the dimensions and placement of the auxiliary ground element with respect to the ground plane and the radiator.

Other features and advantages of the present invention will immediately be recognized by persons of ordinary skill in the art with reference to the attached drawings and detailed description of exemplary embodiments as given below.

BRIEF DESCRIPTION OF THE DRAWINGS

The features, objectives, and advantages of the invention will become more apparent from the detailed description set forth below when taken in conjunction with the drawings, wherein:

FIG. 1A is a side elevation view of a typical prior art monopole antenna.

FIG. 1B is a top elevation view showing an intermediate configuration of the antenna of FIG. 1A.

Figure 2A:
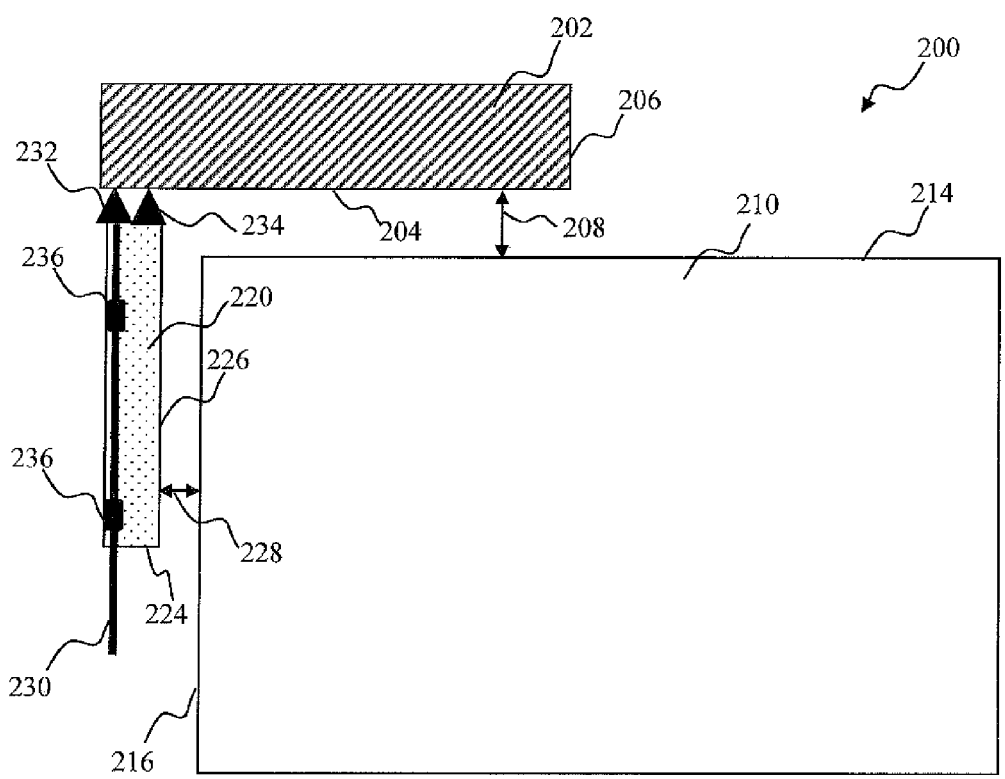
FIG. 2A is a top elevation view showing a first exemplary embodiment of an antenna according to the present invention.

All Figures disclosed herein are © Copyright 2010-2011 Pulse Finland Oy. All rights reserved.

DETAILED DESCRIPTION OF THE PREFERRED EMBODIMENT

Reference is now made to the drawings, wherein like numerals refer to like parts throughout.

The terms "antenna," "antenna system," and "multi-band antenna" as used herein refer generally and without limitation to any system that incorporates a single element, multiple elements, or one or more arrays of elements that receive/transmit and/or propagate one or more frequency bands of electromagnetic radiation. The radiation may be of numerous types, e.g., microwave, millimeter wave, radio frequency, digital modulated, analog, analog/digital encoded, digitally encoded millimeter wave energy, or the like. The energy may be transmitted from location to another location, using or more repeater links, and one or more locations may be mobile, stationary, or fixed to a location on earth such as a base station.

As used herein, the terms "board" and "substrate" refer generally and without limitation to any substantially planar or curved surface or component upon which other components can be disposed. For example, a substrate may comprise a single or multi-layered printed circuit board (e.g., FR4), a semi-conductive die or wafer, or even a surface of a housing or other device component, and may be substantially rigid or alternatively at least somewhat flexible.

The terms "connect", "galvanically connect", "fed", and "grounded", refer generally and without limitation to direct physical and/or electrical connection between any two elements (for example: a radiator and a ground), while the term "electromagnetically couple" refers generally and without limitation to electromagnetic field coupling between two elements that are not in a direct electrical contact with each other.

The terms "frequency range", "frequency band", and "frequency domain" refer generally and without limitation to any frequency range for communicating signals. Such signals may be communicated pursuant to one or more standards or wireless air interfaces.

The terms "feed," "RF feed," "feed conductor," and "feed network" refer generally and without limitation to any energy conductor and coupling element(s) that can transfer energy, transform impedance, enhance performance characteristics, and conform impedance properties between an incoming/outgoing RF energy signals to that of one or more connective elements, such as for example a radiator.

As used herein, the terms "portable device", "mobile computing device", "client device", "portable computing device", and "end user device" include, but arc not limited to, personal computers (PCs) and minicomputers, whether desktop, laptop, or otherwise, set-top boxes, personal digital assistants (PDAs), handheld computers, personal communicators, tablet computers, portable navigation aids, J2ME equipped devices, cellular telephones, smartphones, personal integrated communication or entertainment devices, or literally any other device capable of interchanging data with a network or another device.

Furthermore, as used herein, the terms "radiator," "radiating plane," and "radiating element" refer generally and without limitation to an element that can function as part of a system that receives and/or transmits radio-frequency electromagnetic radiation; e.g., an antenna.

As used herein, the terms "top", "bottom", "side", "up", "down" and the like merely connote a relative position or geometry of one component to another, and in no way connote an absolute frame of reference or any required orientation. For example, a "top" portion of a component may actually reside below a "bottom" portion when the component is mounted to another device (e.g., to the underside of a PCB).

As used herein, the term "wireless" means any wireless signal, data, communication, or other interface including without limitation Wi-Fi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, Long Term Evolution (LTE) or LTE-Advanced (LTE-A), analog cellular, CDPD, satellite systems, millimeter wave or microwave systems, optical, acoustic, and infrared (i.e., IrDA).

Overview

The present invention provides, in one salient aspect, an antenna apparatus with improved bandwidth for use in a portable radio device, and methods for tuning and utilizing the same. In one embodiment, the mobile radio device comprises a ground plane and a monopole antenna, including a radiator and an auxiliary ground element. To increase antenna bandwidth and improve tuning both antenna elements are located generally outside of the ground plane area, while also being coplanar to it. In one exemplary implementation, the antenna radiator is placed along the top horizontal edge of the ground plane, while the auxiliary ground element is positioned outside the left vertical edge of the ground plane. The radiator is electrically connected to the auxiliary ground element at a ground point, and is connected to a feed engine of the portable radio device at a feed point.

In another implementation, a second auxiliary ground element is used in conjunction with the first auxiliary ground to minimize space and improve impedance matching while maintaining wide bandwidth. In one variant, the second auxiliary ground element is disposed between the radiator and the ground plane and oriented substantially parallel to the radiator element. The second auxiliary ground is electrically coupled to the first auxiliary ground to form a single auxiliary electric ground for the antenna assembly.

In another variant, the auxiliary ground element for the antenna is disposed along the vertical (or vertical and horizontal) side(s) of the portable computing device display.

In still another variant, the auxiliary ground is placed proximate a display corner.

In one embodiment, the auxiliary ground elements are manufactured from a narrow strip of copper foil tape (Cu-tape) or thin sheet metal, which acts as a ground plane for the antenna. The antenna radiating element is configured such that has no electrical contact to any other ground (i.e., PCB, display shield or similar) besides the auxiliary ground coupling. The antenna radiator is connected to a feed port of the radio device via a coaxial conductor having a shield.

For optimal performance, the feed conductor shield is in one embodiment electrically connected to the auxiliary ground element. In one variant, the shield is grounded at a plurality of locations along the conductor.

Further control of antenna operation, particularly in one or more lower frequency bands, is achieved by utilizing a switch coupled between the main ground plane of the portable radio device display and the antenna. In one embodiment, the switch is disposed directly next to the antenna, and grounded to the ground plane of the display For efficient space utilization, in one embodiment, the switch connects the auxiliary element of the antenna to the ground plane. The switch is used to selectively change the effective electrical length of the parasitic antenna element by connecting it to different auxiliary ground elements and the main ground plane. In one variant, different discrete components (for example, inductors) at connected at different the output pathways of the switch. This configuration allows control of the lower band operation independently from the upper band, with the upper band operation not significantly affected by the switch.

Detailed Description of Exemplary Embodiments

Detailed descriptions of the various embodiments and variants of the apparatus and methods of the invention are now provided. While primarily discussed in the context of portable radio devices, the various apparatus and methodologies discussed herein are not so limited. In fact, many of the apparatus and methodologies described herein are useful in any number of antennas, whether associated with mobile or fixed location devices, that can benefit from the distributed antenna methodologies and apparatus described herein.

Exemplary Antenna Apparatus

Referring now to FIG. 2A through FIG. 4, exemplary embodiments of the invention of an antenna apparatus useful in portable computer device, such as a laptop computer, tablet computer, or a personal digital assistant (PDA) are described. It will be appreciated that while these exemplary embodiments of the antenna apparatus of the invention are implemented using a planar monopole antenna (selected in these embodiments for its desirable attributes and performance), the invention is in no way limited to monopole antenna-based configurations, and in fact can be implemented using other technologies, such as planar inverted-F (PIFA), planar inverted-L (PILA), patch, or microstrip.

As persons skilled in the art will appreciate, although a laptop computer configuration is used to describe exemplary embodiments below, the present invention contemplates yet additional antenna structures for use with a variety of portable computing devices including, inter alia, handheld computers, smart phones, portable navigation aids, portable media devices, etc.

FIG. 2A is a top view of one embodiment of a mobile radio device antenna assembly configured for use in a portable computer in accordance with the principles of the present invention.

The portable computer 200 comprises a display connected to a ground plane 210 that typically has a rectangular shape (i.e., length 214, width 216).

The antenna assembly comprises a radiator element 202 coupled via a feed conductor 230 to a feed port (not shown) of the portable computer. Typically, the feed port is located within an RF section of the portable computer electronics printed wired board (PWB), also referred to as the RF engine. In one variant, the RF section is implemented on a separate PWB. The feed conductor 230 is electrically coupled to the radiator 202 at a feed point 232. The radiator 202 is preferably disposed on a dialectic substrate (such as ABS, polycarbonate, or other suitable material) that has a rectangular shape (length 204, width 206), wherein the length dimension is greater than the width dimension so as to optimize space use. However, other configurations are possible with the radiator comprising a square or a vertically oriented rectangle (e.g. the dimensions 204, 206 reversed). In another variant, the locations of the radiator 202 and the auxiliary ground element 220 are reversed: that is the radiator 206 is placed along the left vertical edge 216 and the auxiliary ground element is placed along the top horizontal edge 214 of the ground plane.

The radiator width and height are selected based on a specific antenna design requirements including frequency band, bandwidth and efficiency, which can be readily obtained by one of ordinary skill given the present disclosure.

The exemplary ground plane of FIG. 2A comprises a rectangular shape of about 235 mm (9.3 in) in length and about 144 mm (5.7 in) in width. The length 204 of the antenna radiator element of FIG. 2A is about 48 (1.9 in) and the width 206 is about 10 min (0.4 in). In one variant, the radiator 202 is spaced from the ground plane by about 4-5 mm in the vertical as shown in FIG. 2A. As it is appreciated by these skilled in the arts, this distance 208 is application specific-specific. Typically, a larger vertical clearance from the ground plane improves antenna performance at the expense of an increase in the antenna height.

Similarly, the horizontal clearance between the auxiliary ground 220 and the main ground plane 210 is selected based on a tradeoff between performance and size of the antenna. In one variant, the distance 228 is selected to be no less than about 4-5 mm to prevent excessive coupling between the two ground elements.

In one embodiment, the radiator 202 comprises a planar monopole antenna of the type described in commonly assigned and co-pending U.S. patent application Ser. No. 11/883,945 entitled "INTERNAL MONOPOLE ANTENNA" filed Jan. 11, 2006, and incorporated herein by reference in its entirety, although it will be recognized that other designs and configurations may be used with equal success. The exemplary planar monopole radiator element is shaped to form two (2) operating bands for the antenna.

In another embodiment, a distributed multiband antenna apparatus of the type described in a commonly owned and co-pending U.S. patent application Ser. No. 12/764,826 entitled DISTRIBUTED MULTIBAND ANTENNA AND METHODS filed Apr. 21, 2010, and incorporated herein by reference in its entirety is used to facilitate antenna operation in two frequency bands. The antenna assembly comprises a monopole antenna matched for a lower-band operation, and a PIFA antenna for higher-band operation. The use of a separate lower-frequency antenna element facilitates frequency-specific antenna matching, and therefore improves the overall performance of the multiband antenna.

In yet another embodiment, an adjustable monopole antenna of the type described in a commonly owned and co-pending U.S. patent application Ser. No. 12/082,882 entitled ADJUSTABLE ANTENNA AND METHODS filed Apr. 14, 2008, and incorporated herein by reference in its entirety is used. The adjustable monopole antenna comprises an adjusting circuit coupled between the antenna radiator and feed port, and is configured to tune the radiator operating frequency band by adjusting reactance between the feed conductor and the ground in series with the feed conductor. This implementation allows achieving optimal antenna radiator 202 operation, while minimizing space required by the antenna assembly.

Other useful radiator implementations are described in a commonly owned and co-pending U.S. patent application Ser. No. 11/989,451 entitled ADJUSTABLE MULTIBAND ANTENNA AND METHODS filed Jul. 13, 2006, and incorporated herein by reference in its entirety. This application describes an adjustable multiplanar antenna comprising a switching apparatus that enables selective tuning of antenna high-band operation by selective switching of parasitic radiating elements.

Commonly owned and co-pending U.S. patent application Ser. No. 12/673,966, entitled ADJUSTABLE MULTI-BAND ANTENNA AND METHODS filed Feb. 17, 2010, and incorporated herein by reference in its entirety, describes yet additional antenna embodiment useful with the present invention. In one implementation, the feed of the antenna is connected by a multiple-way switch to a plurality of feed points within the radiator assembly. Selecting an appropriate feed point via the switch changes the resonance frequencies, and thus the operating bands, of the antenna. Different radiator configurations are disclosed, including (i) a monopole type, (ii) an inverted-L antenna (ILA) structure, and (iii) a planar inverted-F antenna (PIFA) structure with an additional ground contact.

In another embodiment, the antenna (200) comprises a planar radiator with a first branch forming a lower operating band for the antenna, and a second branch forming an upper operating band. In one variant, the branches typically form a frame-like pattern. A non-conductive slot is disposed between the branches as described in commonly owned and co-pending U.S. patent application Ser. No. 12/082,514 entitled "INTERNAL ANTENNA AND METHODS" filed Apr. 11, 2008, and U.S. patent application Ser. No. 11/901,611 entitled "ANTENNA COMPONENT AND METHODS" filed Sep. 17, 2007, both of which are incorporated herein by reference in their entirety.

In another embodiment, described in commonly owned U.S. patent application Ser. No. 11/648,429 (now U.S. Pat. No. 7,786,938), entitled "ANTENNA COMPONENT AND METHODS" filed Dec. 28, 2006 and incorporated herein by reference in its entirety, multiple radiating elements (a primary and a parasitic, separated by a slot) configured to effect several frequency bands are employed. The primary radiator element is galvanically coupled to feed and ground while the parasitic element is galvanically coupled to ground only and obtains its feed through electromagnetic coupling over the slot. Shaping of the radiating elements and the slot allows further control of antenna operating frequency band. This implementation provides additional flexibility in configuring antenna elements with respect to the ground plane and optimizing space utilization.

In still another embodiment, a multiband antenna with multiple resonance circuits forming separate bands is used.

One such antenna is described in detail in a commonly owned U.S. patent application Ser. No. 11/603,511 (now U.S. Pat. No. 7,663,551), entitled "MULTIBAND ANTENNA APPARATUS AND METHODS" filed Nov. 22, 2006, and incorporated herein by reference in its entirety. A conductive coating is disposed on a dielectric substrate and has a pattern, which functions as a parallel resonance circuit between the head part and the tail part of the element. The resonance frequencies of the antenna and thus its operating bands can be tuned independently of each other.

Shaping of the radiating elements and the slot allows further control of antenna operating frequency band.

A yet different embodiment of the antenna radiator useful with the present invention is described in commonly owned and co-pending U.S. patent application Ser. No. 11/922,976 entitled "INTERNAL MULTIBAND ANTENNA AND METHODS" filed Nov. 15, 2005, and incorporated herein by reference in its entirety. The antenna comprises a main element connected to the antenna feed conductor, and a short-circuited parasitic element. The elements are typically elongated, and at least portions thereof, corresponding to a certain operating band, are substantially perpendicular to each other. Two resonances, the frequencies of which fall within two different operating bands of the antenna, are excited also by the parasitic element. In order to implement the resonances of the parasitic element, the coupling between the elements takes place through a very narrow slot near the feed point and the short-circuit point of the parasitic element.

Still other variations are contemplated for use consistent with the present invention, such as e.g., a radiator structure configured to effect antenna operation in different frequency bands of the type described in a commonly owned and co-pending U.S. patent application Ser. No. 11/801,894 entitled "ANTENNA COMPONENT AND METHODS" filed May 11, 2007, and incorporated herein by reference in its entirety. This implementation utilizes a small auxiliary circuit board, disposed between antenna radiator and a ground plane, to provide antenna matching for a particular operating band and radiator pattern, while maintaining small footprint.

As discussed supra, operation of a monopole antenna radiator disposed above a ground plane (i.e. FIG. 1A) is invariably affected by the characteristics of the ground plane (such as dimensions, material and proximity).

Portable computer displays (e.g., LCD, LED, OLED, etc.) employ a ground plane that typically matches the screen size, and can be quite large (100-250 mm or 4-20 inches) compared to the size of a typical RF antenna (40-80 mm). The interaction between the large display ground plane and the antenna radiator adversely affects antenna bandwidth and efficiency, in particular for an antenna configured to operate in different frequency bands (e.g. lower band 700-900 MHz and high band 1700-2400 MHz).

In one variant, the planar antenna radiator element of the exemplary embodiment is disposed outside of the footprint of the display ground plane at the front-display plane.

In the particular implementation of FIG. 2A, the radiator 202 is positioned a predetermined distance 208 from the ground plane 210 proximate to the top left corner. The exact lateral position and the vertical distance 208 are selected based on specific antenna design parameters. The radiator 202 is position such that no electrical contact between the radiator 202 and the ground plane 210 occurs, and the projection of the radiator taken in a direction normal to the plane of the radiator (i.e., normal to the plane of FIG. 2A) does not overlap with the projection of the ground plane, the projection taken in the same direction.

In order to impart electrical grounding functionality to the antenna configuration of the embodiment depicted in FIG. 2A, an auxiliary ground element 220 that is placed alongside the vertical dimension 216 of the ground plane 210. The auxiliary ground element is spaced from the ground plane by a distance 228, and preferably comprises a narrow rectangle having width 224 that is smaller than the height 226. The auxiliary ground element 220 is fabricated from a narrow strip of copper foil tape (Cu-tape), or comprises a thin sheet metal element. The antenna radiator 202 is electrically coupled at a ground point 324 to the auxiliary ground element 220, thereby effecting a ground plane for the antenna assembly which has no other ground contacts (i.e., main computer PWB, display shield or similar).

The electrical shield of the feed conductor 230 is electrically coupled to the auxiliary ground plane at one or more locations 236 to achieve optimum electrical performance of the antenna. In one variant, a single coupling location is sufficient (not shown). In another variant, multiple grounding locations are used (as shown in FIG. 2A). Ground connections 236 are effected preferably via solder joints. Other techniques, such as crimps, mechanical clips, may be used with equal success, however. The feed conductor is routed in the illustrated embodiment from the main PWB (typically located at the base of the laptop) along the vertical edge of the display.

The length 226 of the antenna auxiliary ground element of the embodiment of FIG. 2A is about 135 mm (5.3 in), and the width 224 is about 3 mm (0.1 in). The auxiliary ground element 220 is spaced from the ground plane 210 by a distance 228 of about 4-5 mm in the horizontal, as shown in FIG. 2A.

The feed conductor is in one embodiment a coaxial cable with a shield connected to the main PWB via a connector. The feed conductor of the coaxial feed cable connects antenna feed point to RF engine feed and the shield conductor is connected to ground. Other cable configurations are possible, e.g., twisted pair, flex circuit are usable as well. The PWB connection can be accomplished also via a solder joint, mechanical friction joint (crimp, push-in). The length of the feed conductor is in the illustrated embodiment approximately 60 mm (2.4 in) and it is adjusted according to size and configuration of the portable computing device.

The use of the auxiliary ground plane for the antenna configuration of FIG. 2A enables more precise control over antenna performance. Antenna operation in the lower band is effected, based at least in part, on grounding the auxiliary element at the ground point 234 that is disposed proximate to the feed point 232.

Figure 2B:
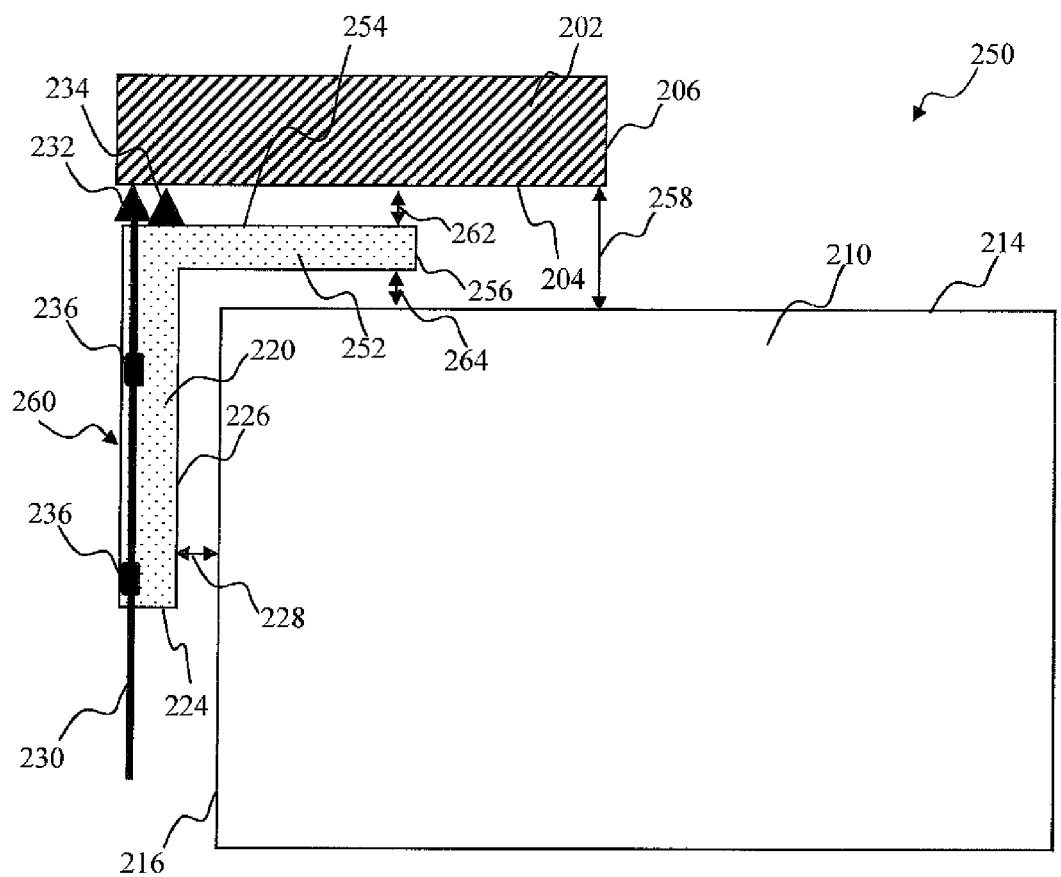
FIG. 2B is a top elevation view showing a second exemplary embodiment of an antenna configured in accordance with the principles of the present invention.

By using the auxiliary ground plane with the monopole laptop antenna, the wideband performance of the antenna of FIGS. 2A and 2B is markedly improved. This is due to, inter alia, the sensitivity of antenna performance to the electrical size (i.e., the physical size compared to the wavelength). The exemplary embodiments described with respect to FIG. 2A and FIG. 2B advantageously offer a cost-effective solution by decreasing the need for multiple radiator elements and individual matching components to cover several operating bands of the antenna apparatus.

An antenna apparatus configured in accordance with the principles of the present invention is suitable for any portable radio device, including those which do not afford an appropriately-configured ground-plane for the antenna. To achieve the best performance, it is desirable to configure the auxiliary ground element such that it does not have any other electrical contacts with conductive elements of the portable device (e.g., a metal chassis, display shield, main PWB, etc.), except as described with respect to the embodiments of FIG. 2A, FIG. 2B, and FIG. 3. In one variant, the auxiliary ground element is incorporated into the plastic cover of the display. The auxiliary ground is in one embodiment fabricated as metal sheet of appropriate thickness. Alternatively, it is realized as a flex mounted segment mounted onto a plastic frame. The exact dimensions depend on the particular application, but the length is determined by antenna tuning and lower band frequency.

Another advantage of the exemplary antenna embodiment described herein is the ability to relatively easily adjust antenna operating band and other performance parameters by varying the size and the placement of the auxiliary ground element. Typically, the size of the ground plane 210 is defined at the design stage for the portable computing device, and cannot be easily altered due to mechanical constrains of the device enclosure. Furthermore, the radiator element is typically manufactured using precise fabrication methods such as etching, flex circuits, low temperature co-fired ceramic (LTCC), surface metal deposition, or microstrip. It is therefore often impractical to alter the size or shape of the radiator in order to modify antenna frequency response or other operating parameters (sensitivity, total efficiency, bandwidth, directionality, or return loss) when it is desirable to operate the portable computer in a new frequency band that was not considered at the device design stage.

In accordance with the principles of the present invention, tuning of the operational parameters the exemplary antenna of FIG. 2A is effected by varying the size (e.g., dimensions 224, 226) and the placement (e.g., distances 228, 208) of the auxiliary ground plane element 220. It is appreciated by those skilled in the art that a multitude of easily adjustable auxiliary ground plane elements can be configured to suit a particular antenna design requirements, without incurring any changes to the radiator or the main ground plane configurations.

The exemplary antenna of FIG. 2A is configured to operate in a lower frequency band from 700 MHz to 960 MHz, as well as the higher frequency band from 1710 MHz to 2170 MHz. This capability advantageously allows operation of a portable computing device with a single antenna over several mobile frequency bands such as GSM710, GSM750, GSM850, GSM810, GSM1900, GSM1800, PCS-1900, as well as LTE frequency bands. As persons skilled in the art will appreciate, the frequency band composition given above may be modified as required by the particular application(s) desired, and additional bands may be supported/used as well.

Second Exemplary Antenna Apparatus

Referring now to FIG. 2B, a second exemplary embodiment of an antenna apparatus configured in accordance with the principles of the present invention is shown in detail.

The exemplary antenna 250 of FIG. 2B comprises a radiator element 202, a ground plane 210, and a feed conductor 230. However, the configuration of the auxiliary ground plane element 260 is different as compared to the auxiliary ground element 220 of FIG. 2A. Specifically, as shown in FIG. 2B, the auxiliary ground plane element 260 is L-shaped, and comprises two portions: (i) the vertical portion 220 (having length 226 and width 224), and (ii) the horizontal portion 252. The vertical portion is positioned alongside a left vertical edge of the ground plane 210, and is spaced from it by a distance 228. The horizontal element 252 is positioned along the horizontal edge 214 of the ground plane 210, and is spaced by a distance 258 from the ground plane.

In one exemplary implementation, the horizontal element 252 is further spaced by a distance 262 from the radiator 202 horizontal edge, as shown in FIG. 2B. In an alternate implementation (not shown), the spacing 262 is negligible, and the element 252 is placed adjacent the radiator bottom edge 204. Effectively, the antenna of the embodiment of FIG. 2B, wherein the auxiliary ground plane element 260 is "wrapped around" a top corner of the display ground plane 210, allows for a greater effective electrical length (LG) of the auxiliary ground element, as LG can be approximated as the sum of the dimensions 226, 254.

Tuning of the operational parameters the exemplary antenna of FIG. 2B is effected by varying the size (e.g., dimensions 224, 226, 252, 256) and the placement (e.g., distances 228, 258, 262, 264) of the auxiliary ground plane element 260.

In an alternate embodiment (not shown), an L-shaped auxiliary ground element is on the wrapped around at least a portion of the radiator 202 length 204 and a portion of the adjacent vertical side 216 of the main ground plane 210. This implementation reduces space that is required by the antenna.

Figure 3:
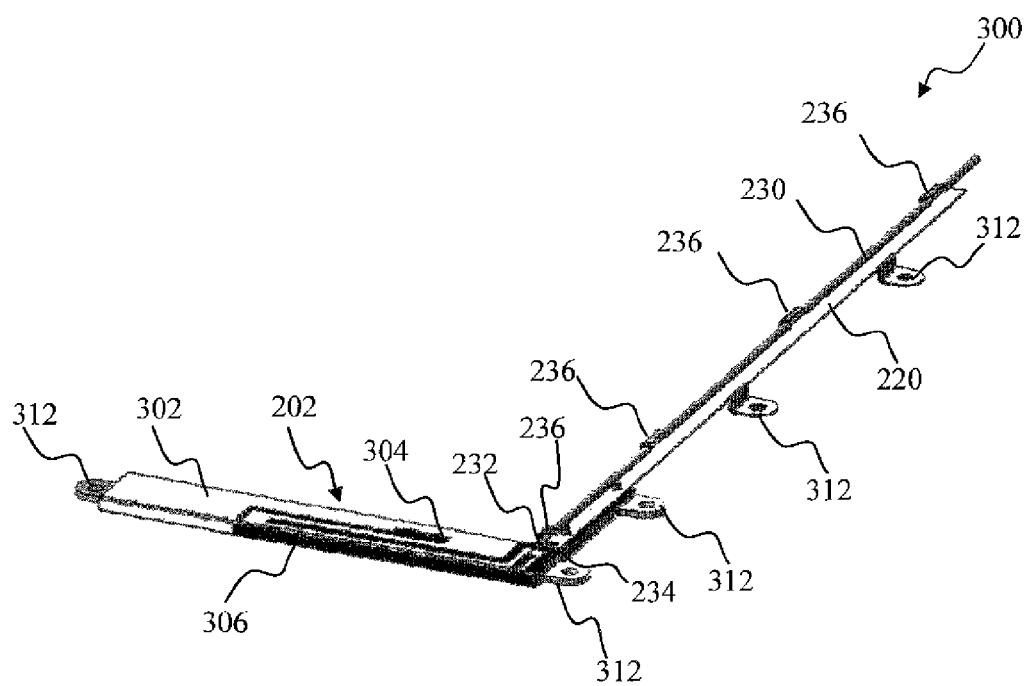
FIG. 3 is an isometric view of the exemplary antenna embodiment of FIG. 2A, configured for installation within a laptop display enclosure.

Referring now to FIG. 3, an exemplary antenna assembly 300 configured in accordance with the embodiment of FIG. 2A and designed to fit into the display cover of a portable computer is shown in detail. The antenna assembly 300 comprises a plastic carrier 302 with the radiator 202 portions disposed thereon. A high frequency band portion 304 is disposed on the top (wide) side, while the lower band radiator portion is disposed on a narrow side, oriented perpendicular to the high band portion 304. It will be appreciated, however, that additional portions for additional frequency bands may be used as well. The radiator 202 is coupled to the auxiliary ground element 220 at the ground point 234, and to the feed conductor 220 at the feed point 232. The feed conductor shield is electrically coupled to the auxiliary ground element 220 at a plurality of locations 236. The assembly 300 further comprises a plurality of flanges 312 configured to enable mounting of the assembly in the housing of the portable device.

The exemplary antenna embodiments described with respect to FIG. 2A, FIG. 2B, and FIG. 3 offer substantial advantages over existing solutions. Specifically, these advantages include improved bandwidth, lower cost, and lower complexity, as these embodiments reduce the need for implementing discrete matching components to cover several (two or more) operating bands of the antenna. The antenna apparatus configured in accordance with the principles of the present invention also provides a better control of antenna resonance, and particularly bandwidth, and greatly facilitates efficient wide-band and multiband antenna implementation for portable computing devices (e.g. laptops or tablets), thus overcoming previously existing limitations related to the large ground plane of portable computer displays.

Auxiliary Ground Switching

Figure 4:
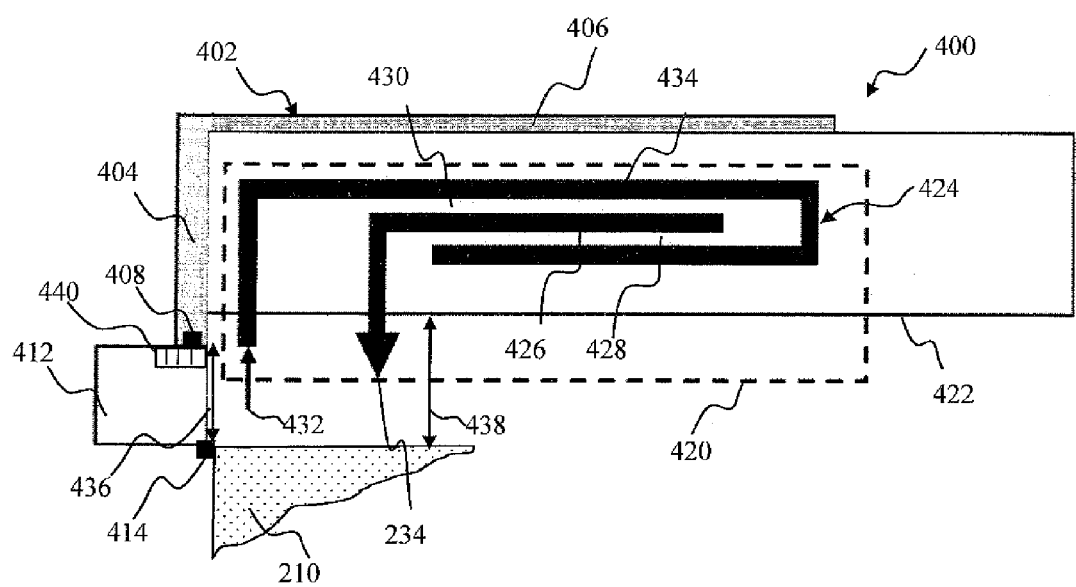
FIG. 4 is a top elevation view showing an antenna configured in accordance with a third embodiment of the present invention.

FIG. 4 illustrates another exemplary embodiment of the antenna assembly of the present invention, comprising a switching apparatus. The antenna assembly 400 of FIG. 4 comprises a radiating structure 420 disposed on a dielectric support element 412. The exemplary radiator comprises two portions effecting antenna operation in two frequency bands: (i) a high band portion, 426 and (ii) a lower band portion 424. The two portions 424,426 are configured to form slots 428, 430 therebetween, as shown in the exemplary embodiment of FIG. 4. Other configurations are possible and described in detail in the co-pending and co-owned U.S. patent applications previously described and incorporated by reference herein.

Support element 422 preferably comprises a dielectric material such as plastic, ceramic, FR4, or other suitable substrate. The radiator element is in one embodiment a prefabricated flex circuit. Other manufacturing method are possible, including e.g., etching, flex circuits, low temperature co-fired ceramic (LTCC), surface metal deposition, or microstrip.

The radiating structure 420 is fed via a feed conductor (not shown) at a feed point 432. The feed conductor is in one embodiment is coaxial cable with the feed conductor connected to the feed point 432 and the shield to the ground point 234. In one implementation, the feed cable connected to the RF section of the radio device an RF connector. Other cable configurations are possible, e.g., twisted shielded pair, flex circuit. PWB connection can be also effected via a solder joint, mechanical friction joint (crimp, push-pull). The length of the feed conductor is in the illustrated embodiment 60 mm (2.4 in), and is adjusted according to size and configuration of the portable computing device. In one approach the coaxial cable is routed from the feed of the antenna (front-display side) to the RF engine at the back of the device with the cable shield grounded to the main ground plane (for example, display shield, or metal chassis).

The radiator element is spaced from the ground plane by a distance 438, which is selected based on a tradeoff between antenna size and performance for a particular application. The greater the distance from the ground plane, the better is the performance of the antenna. I one variant the distance 438 is about 4-5 mm.

In one variant, both radiator elements 424, 426 are disposed on the same planar surface of the support element 424, as shown in FIG. 4.

The antenna assembly 400 further comprises an auxiliary ('parasitic') ground clement 402. In the embodiment of FIG. 4, the auxiliary element 402 is formed by a horizontal portion 406 and a vertical portion 404. In another embodiment (not shown) the auxiliary element comprises a single linear element. The auxiliary ground element is placed to 'wrap around' the radiator support element 422 top optimize space utilization. The element 402 is coupled to the main radiator by, inter alia, an electromagnetic field of the main radiator surface currents electromagnetically inducing corresponding surface currents in the auxiliary element 402.

The auxiliary ground element is further connected to the main ground plane 210 at a ground point 408 via a switch 412. The switch 412 is in one embodiment a low-loss, high-power linear single-pole four-throw solid state switch such as RFMD high-power GaAs SP4T module. Any other solid-state RF switch technologies may be used as well. The switch 412 is in this embodiment mounted on a separate small size (e.g., 13 mm×14 mm) PWB that is placed directly next to the antenna radiator, in-between the main ground plane point 414 and the lower edge of the vertical portion 404 of the auxiliary ground element. The switch is controlled by, e.g., a suitable logic element or IC within the portable computer processing circuitry via a control conductor (not shown), which enables selective coupling of the auxiliary ground element 402 to the main ground plane 410.

When the switch 412 is open, the auxiliary ground is disconnected from the main ground plane effectively disconnecting the antenna radiator.

When the switch is in a closed position, the auxiliary ground element is connected to the input 408 of the switch, and the ground plane point 414 is connected to the output of the switch, therefore which changing electrical length of the auxiliary element and hence the electric length of the antenna. Changes of antenna electric length enables control of antenna lower band operating parameters (e.g. bandwidth and efficiency) independently form the high band operation. Antenna operation in the lower band is affected, based at least in part, on placing the auxiliary element ground 408 proximate to the radiator feed point 432.

In one approach, the switch 412 comprises 4 exclusive-or (XOR) closed states. When the switch is closed, the signal from the input of the switch propagates to the output of a switch via the switch. The output of the switch is connected differently in each state. In state 1 the output is connected straight to ground/ground plane 210. In states 2-4 different electric elements (such as inductors L1, L2, L3) arc placed in series between the respective switch output port and the ground. The presence of different component in series at the output of the switch and before the ground changes the electrical length of the auxiliary ground element. Since the parasitic ground controls the lower band (LB) antenna operation, different switch states change antenna lower operating band. It is appreciated by those skilled in the art that other electric elements are compatible and useful with the present invention, such as, for example, a capacitor, capacitor-inductor combination, and/or a combination of capacitive, inductive and shunt/series elements.

In a further variant (not shown), the auxiliary ground comprises a plurality of L-shaped and/or straight conductors disposed in place of the single auxiliary ground element 402 of FIG. 4. Connecting different output ports 440 of the switch 412 to different individual auxiliary ground elements advantageously enables finer control of antenna electrical length and lower band performance tuning.

The antenna configuration of the embodiment of FIG. 4 offers substantial advantages over conventional designs, particularly for antenna lower band operation. Specifically, the selective coupling of auxiliary ground element to ground via different switch paths (that have different electric elements, such as inductors) changes the electrical length of the parasitic element of the antenna, thus controlling antenna operation in the lower frequency band.

As a result of the LB switching described above, electromagnetic losses in are reduced compared to the conventional design when switching is applied to the high-frequency band via impedance changes.

The auxiliary ground element 402 is in one embodiment fabricated from a narrow strip of copper foil tape (Cu-tape), or comprises a thin sheet metal element. The various portions 404, 406 preferably comprise narrow rectangles having lengths that are greater than their widths. The length of the vertical portion 404 of the auxiliary ground element is in the illustrated embodiment about 70 mm (5.3 in), and the width is about 3 mm (0.1 in). The length of the horizontal portion 406 of the auxiliary ground element is about 65 mm (5.3 in), and the width is about 3 mm (0.1 in). The auxiliary ground element is spaced from the ground plane by a distance 436, which is determined by the size of the switch and the available space.

User demands for smaller and most efficiently packaged portable computer devices typically result in a limited amount of space available for placing discrete electronics components near or on the display element. For compliance reasons, laptop antennas are typically placed on the display side (where the space is least available), so as to reduce specific absorption rates (SAR).

To overcome these limitations, in one embodiment, the antenna assembly 400 is located proximate a top corner of the portable computer enclosure; i.e., the display cover (lid) in the case of a laptop computer or main housing of a "tablet" device. The switching assembly is placed in the corner of the tablet device. In one variant, the notebook display size is about 230 mm in length, and about 140 mm in width. In one approach the antenna radiator 420 is about 65 mm in length, about 12 m in width, while parasitic element 402 on the other configured perpendicular to the plane of the to the main radiator and is about is 2 min in width and about 65 mm in length. The combined antenna therefore is a 3-dimensional structure.

The exemplary antenna of FIG. 4 is configured to operate in a lower frequency band from 700 MHz to 960 MHz as well as a higher frequency band from 1710 MHz to 2170 MHz. As previously noted, this allows operation of a portable computing device with a single antenna over several mobile frequency bands such as GSM710, GSM750, GSM850, GSM810, GSM1900, GSM1800, PCS-1900, as well as LTE frequency bands.

As persons skilled in the art will appreciate, the exact sizes described above with respect to the embodiment of FIG. 4 are merely illustrative, and correspond to one specific embodiment of the invention. As portable computer sizes and their operating frequencies can vary dramatically, the dimensions of the radiator element, auxiliary ground plane and main ground plane, selected in accordance with the specific requirements, will differ from the values quoted above. Furthermore, the frequency band composition given above may be modified as required by the particular application(s) desired, including more and/or different frequency bands.

Performance

Figure 5A:
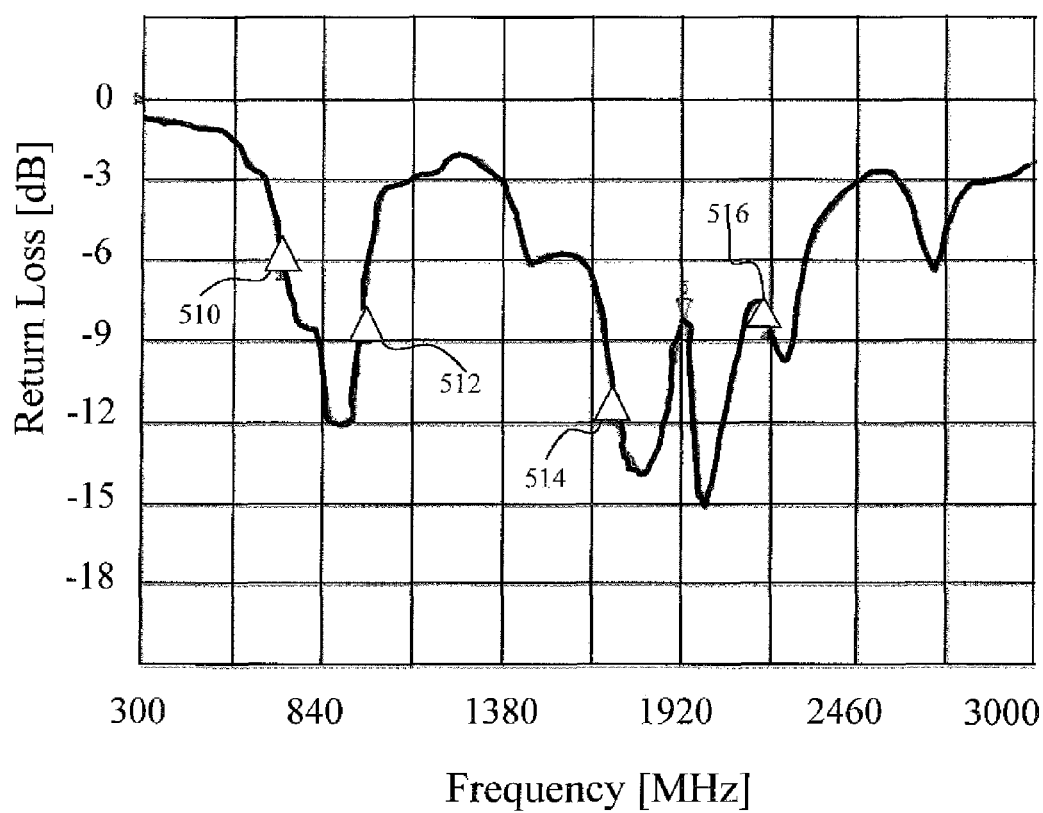
FIG. 5A is a plot of measured free space input return loss obtained with the exemplary antenna embodiment of FIG. 2A.
Figure 5B:
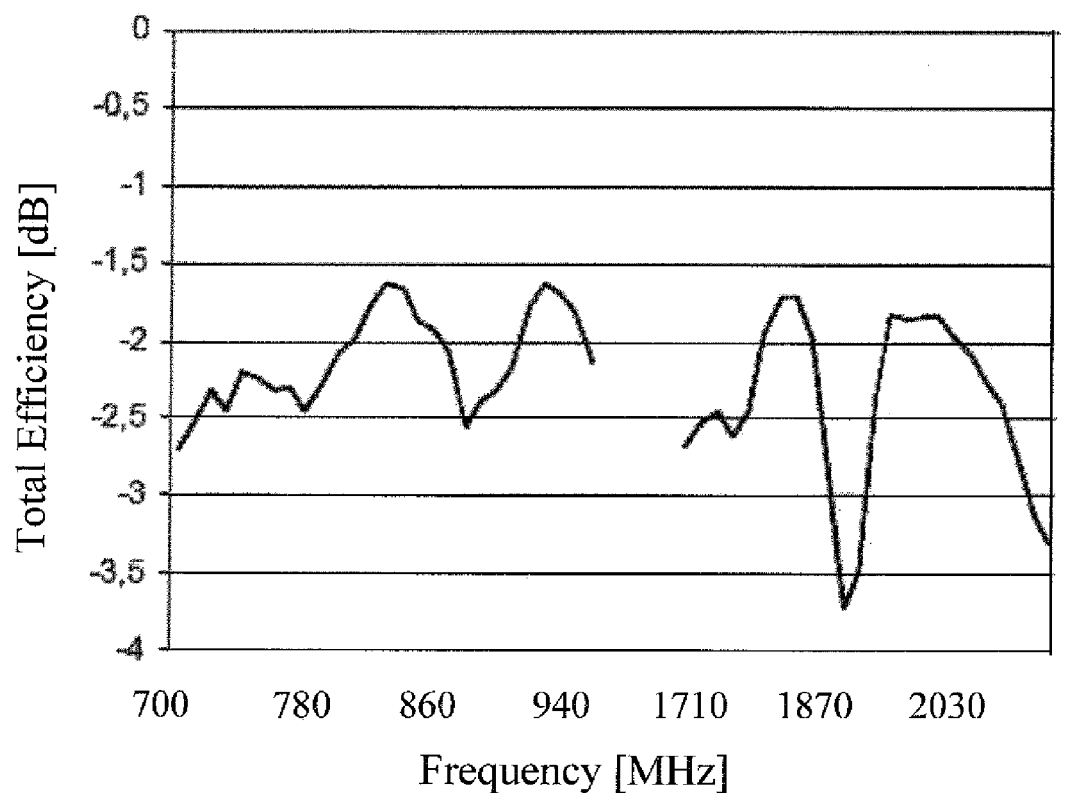
FIG. 5B is a plot of measured total efficiency obtained with the exemplary antenna embodiment of FIG. 2A.

Referring now to FIG. 5A and FIG. 5B, performance characteristics of the exemplary antenna apparatus of the embodiment of FIG. 2A are presented.

FIG. 5A shows a plot of free-space return loss S11 (in dB) as a function of frequency, measured with the exemplary antenna as configured with the auxiliary ground element length 226 of 135 mm (5.3 in). The measurements of FIG. 5A are taken over both the lower frequency band (i.e., 700 MHz to 960 MHz) and the upper frequency band (i.e., 1710 MHz to 2170 MHz). The first (triangle) marker symbols 510, 512 denote the boundaries of the lower band, and the second marker symbols 514, 516 denote boundaries of the upper band. The return loss measured with the antenna ranges from −6 dB to −12 dB.

FIG. 5B presents data regarding measured free-space efficiency for the same antenna described above with respect to FIG. 5A. Antenna total efficiency (in dB) is defined as decimal logarithm of a ratio of radiated electromagnetic power and input electric power:

$$AntennaEfficiency = 10\ \log_{10}\left(\frac{Radiated\ Power}{Input\ Power}\right) \quad \text{Eqn. (1)}$$

An efficiency of zero (0) dB corresponds to an ideal theoretical radiator, wherein all of the input electrical power is radiated out in the form of electromagnetic energy. The data in FIG. 5B demonstrate that the exemplary antenna embodiment configured according to the invention achieves a total efficiency between −2.5 and −1.7 dB over most of the lower frequency band between 700 MHz and 960 MHz.

These results advantageously demonstrate improved performance of the exemplary antenna of the invention. Efficiency results illustrated in FIGS. 5A-5B are not attainable with prior art planar antennas and require a three dimensional antenna structure achieve antenna efficiency that is similar to the performance shown in FIGS. 5A-5B.

Figure 6A:
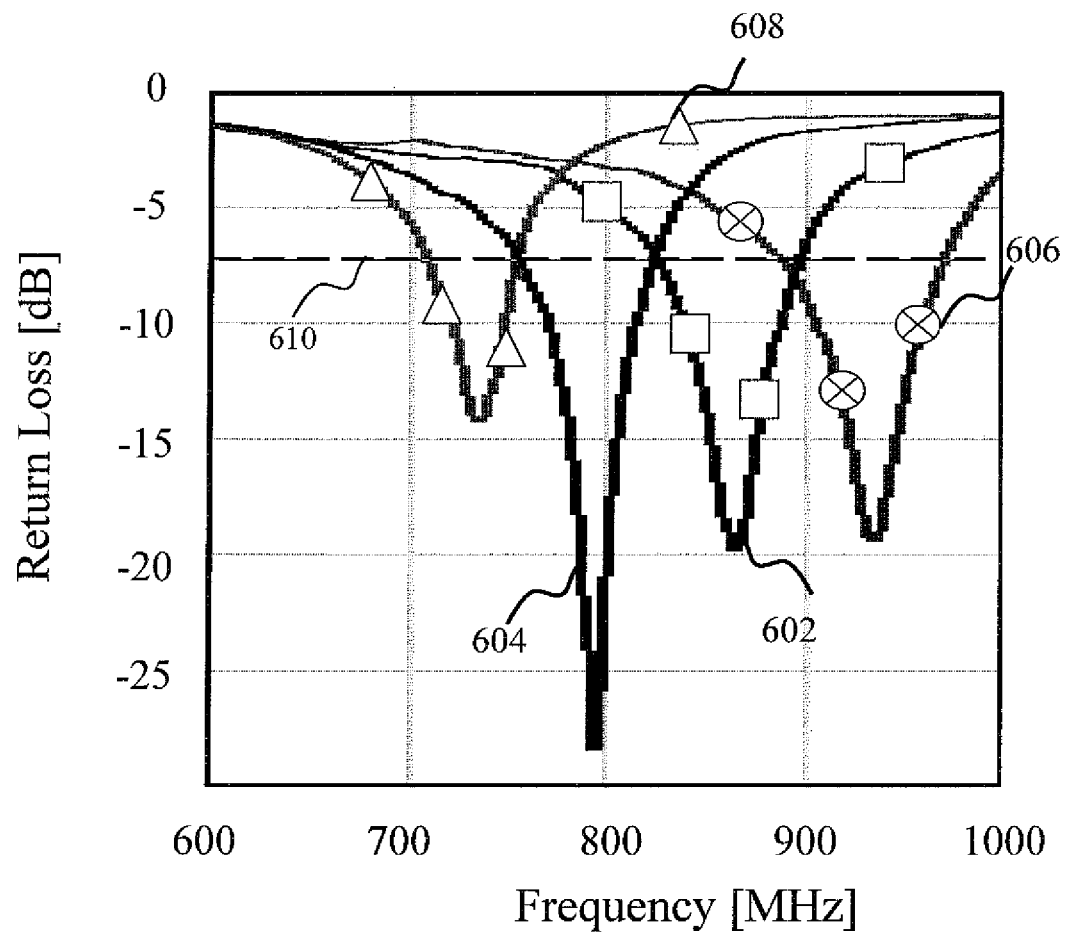
FIG. 6A is a plot of measured free space input return loss obtained with the exemplary antenna embodiment of FIG. 4, operating in a lower frequency band.
Figure 6B:
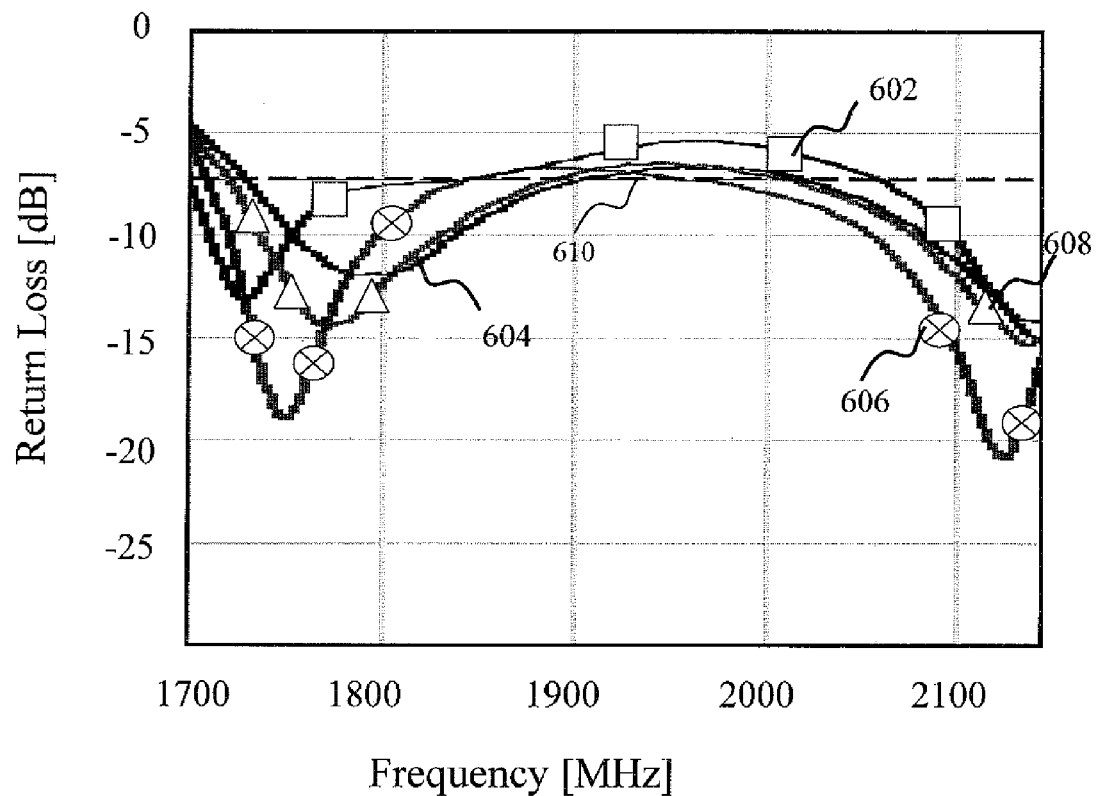
FIG. 6B is a plot of measured total efficiency obtained with the exemplary antenna embodiment of FIG. 4, operating in an upper frequency band.

Referring now to FIG. 6A through FIG. 6C, performance characteristics of the exemplary antenna apparatus of the embodiment of FIG. 4 are presented.

FIGS. 6A-6B show a plot of free-space return loss S11 (in dB) as a function of frequency. The electric length of the antenna auxiliary ground element 402 is 135 mm (5.3 in), and the feed conductor is about 60 mm (2.4 in) in length in this particular embodiment. The measurements of FIG. 6A are taken over the lower frequency band (i.e., 700 MHz to 960 MHz) and FIG. 6B over the upper frequency band (i.e., 1710 to 2170 MHz). The different curves illustrated correspond to the following switch states: (i) 608—state '01'; (ii) 604—state '00'; (iii) 602—state '10'; and (iv) 606—state '11'. The line 610 marks the −6 dB level. The results shown in FIG. 6A demonstrate selective control of the antenna lower frequency operating band (a single sharp anti-resonance) via changing of the switch states.

FIG. 6B presents free-space return loss data measured in the upper frequency band (i.e., 1710 MHz to 2170 MHz) for the same switching states as described above with respect to FIG. 6A. The results shown in FIG. 6B confirm that lower band control via switching does not substantially affect performance of the antenna in the upper band as illustrated by a stable behavior of states 602, 604, 606, 608 in FIG. 6B.

Figure 7A:
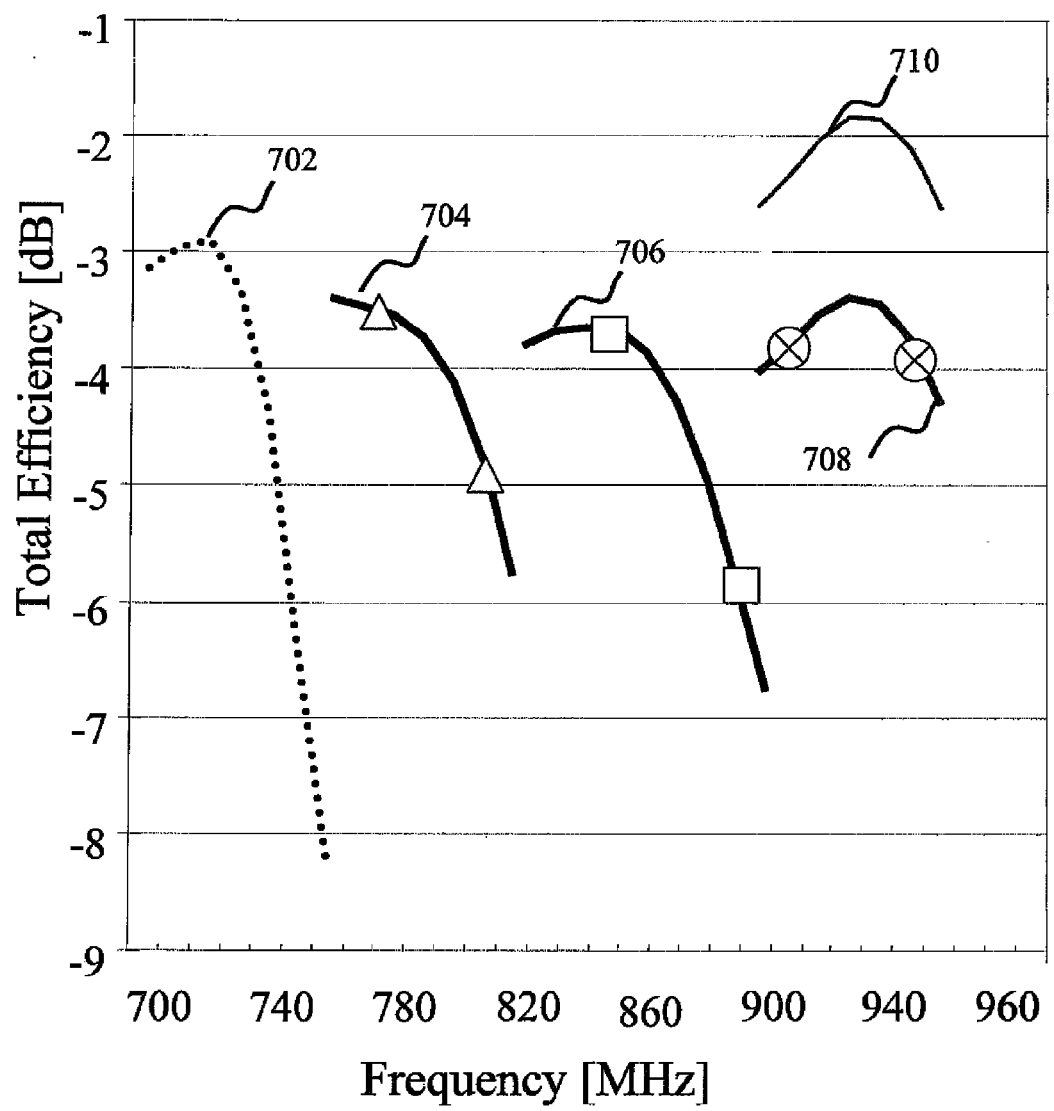
FIG. 7A is a plot of measured free space input return loss obtained with the exemplary antenna embodiment of FIG. 4, operating in a lower frequency band.
Figure 7B:
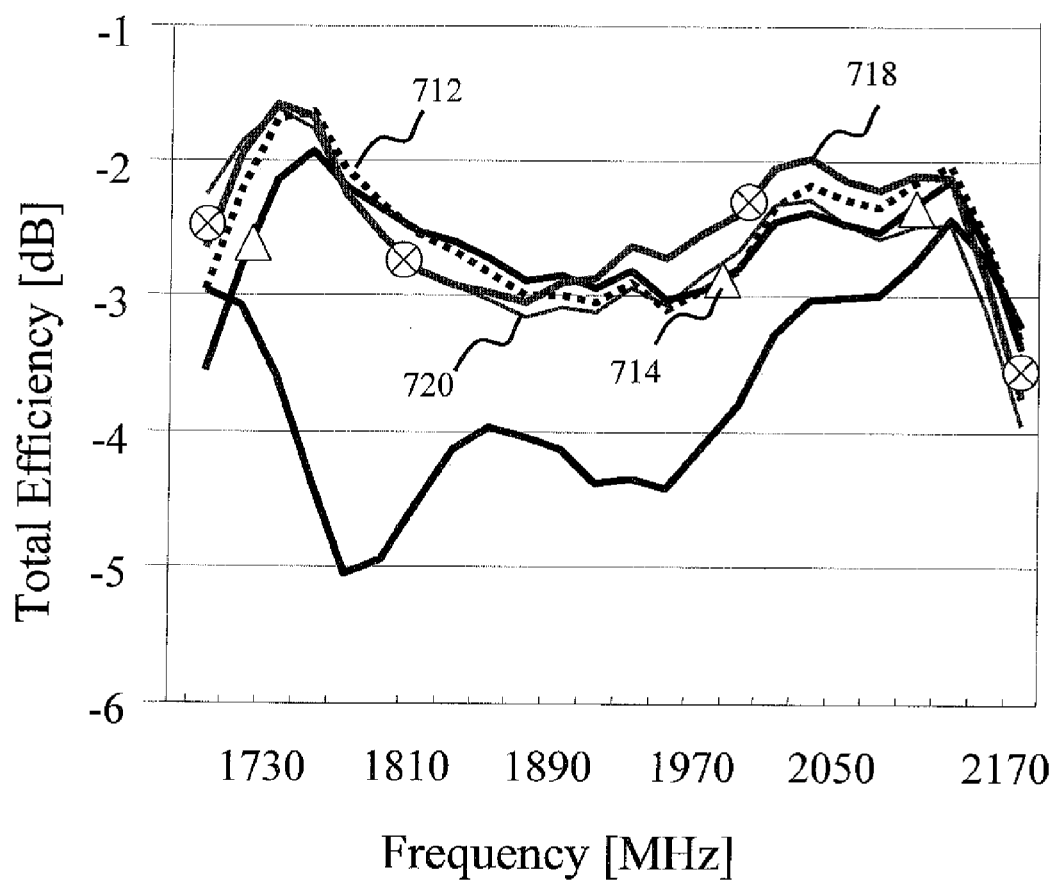
FIG. 7B is a plot of measured total efficiency obtained with the exemplary antenna embodiment of FIG. 4, operating in an upper frequency band.

The total efficiency data measured for the antenna of FIG. 4 in the lower frequency and the upper and bands is presented in FIGS. 7A and 7B, respectively. The different curves illustrated correspond to the following switch states: (i) the dotted line 702 corresponds to the switch state '01'; (ii) the line 704 marked by triangles corresponds to the switch state '00'; (iii) the line 706 marked by squares corresponds to the switch state '10'; and (iv) the line 708 marked by circles corresponds to the switch state '11'. The illustrated solid line 710 corresponds to the passive ground configuration; i.e. the auxiliary ground element connected directly to ground bypassing the switch.

The data of FIG. 7A (curves 702, 704, 706, 708) demonstrate that antenna bandwidth is controlled over a wide frequency band by changing switching states. At the same time, the efficiency loss between different switch states is not significant (less than 0.8 dB). This is in contrast to the conventional ground switching of the prior art, wherein upper band switching induces substantial losses, and substantially reduces antenna efficiency. Comparison of the data of curves 702, 704, 706, 708 with the passive case data 710 shows that the presence of the switch reduces antenna efficiency by about 1.1 to 1.6 dB due to signal attention by the switch.

The total efficiency data measured in the upper band of the antenna of FIG. 4 is given in FIG. 7B. The different curves illustrated correspond to the following switch states: (i) the dotted line 712 corresponds to the switch state '01'; (ii) the line 714 marked by triangles corresponds to the switch state '00'; and (iii) the line 718 marked by circles corresponds to the switch state '11'. The illustrated solid line 720 corresponds to the passive ground configuration; i.e., the auxiliary ground element connected directly to ground bypassing the switch. Data collected in the upper band demonstrate negligible effect of switching (curves 712, 714, 718, 720) on the upper band antenna operation, with the exception of the switch state '01' as shown in FIG. 7B.

Advantageously, an antenna configuration that uses lower band switching of separate auxiliary ground elements as in the illustrated embodiments allows for optimization of antenna operation in the lower frequency band independently from the upper band operation.

Furthermore, the use of a separate auxiliary ground element allows the antenna to achieve better antenna matching to the operating bands. It also removes the need for specialized grounding and tuning methods that rely on multiple discrete components, thereby reducing the overall antenna size, cost and complexity, while also improving reliability. This solution is highly cost-effective, as it decreases the need for matching components needed to cover many bands as in the prior art.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. An antenna apparatus for use in a radio device, the radio device operable in a lower frequency band and an upper frequency band and comprising a feed port and a ground plane, said apparatus comprising:
    a monopole radiator;
    a substantially planar auxiliary ground element; and
    a switching apparatus disposed between the ground plane and the auxiliary ground element and configured to selectively couple the auxiliary ground element to the ground plane;
    wherein:
        the monopole radiator is coupled at a first location to the feed port via a feed conductor and at a second location to the first auxiliary ground element;
        the auxiliary ground element is disposed substantially external to an outside perimeter of the ground plane; and
        the auxiliary ground element is disposed substantially external to an outside perimeter of the monopole radiator.

2. The antenna apparatus of claim 1, wherein the monopole radiator is configured to be substantially coplanar with the ground plane.

3. The antenna apparatus of claim 2, wherein the auxiliary ground element is configured to be in a plane substantially perpendicular to the monopole radiator.

4. The antenna apparatus of claim 1, wherein the switching apparatus is adapted to switch the operating frequency of the lower frequency band.

5. The antenna apparatus of claim 4, wherein the lower frequency band comprises a long term evolution (LTE) band covering a frequency range from about 700 MHz to about 960 MHz; and
    the upper frequency band comprises an LTE band covering a frequency range from about 1700 MHz to about 2200 MHz.

6. The antenna apparatus of claim 1, further comprising a plurality of reactive circuits, each coupled to the ground plane and each being selectable by the switching apparatus.

7. The antenna apparatus of claim 6, wherein each reactive circuit comprises an inductor coupled to a respective output port of the switching apparatus.

8. The antenna apparatus of claim 6, wherein each reactive circuit is configured to change an electric length of the auxiliary ground element.

9. The antenna apparatus of claim 1, wherein the switching apparatus is adapted to control operating frequency of the lower frequency band by, at least in part, selectively coupling a plurality of reactive elements between the ground plane and the auxiliary ground element.

10. An antenna apparatus for use in a portable radio device, the portable radio device comprising a feed port and a ground plane, the antenna apparatus comprising:
    a first substantially planar auxiliary ground element having a first dimension and a second dimension;
    a switching apparatus configured to selectively couple the first substantially planar auxiliary ground element to the ground plane; and
    a substantially planar radiator element having a third dimension and a fourth dimension and galvanically connected to the feed port at a first location via a feed conductor, and to the first substantially planar auxiliary ground element at a second location;
    wherein both the first substantially planar auxiliary ground element and the substantially planar radiator element are located outside of the ground plane;
    wherein:
        the first substantially planar auxiliary element is disposed substantially external to the ground plane perimeter yet being coplanar to the ground plane;
        the first substantially planar auxiliary element is disposed substantially external to the substantially planar radiator element perimeter yet being coplanar to the substantially planar radiator element;
        the first dimension is substantially perpendicular to the third dimension; and
        the first substantially planar auxiliary element is configured to increase antenna bandwidth.

11. The antenna apparatus of claim 10, wherein the first substantially planar auxiliary ground element and at least a portion of the substantially planar radiator element are configured to be coplanar to the ground plane.

12. An antenna apparatus for use in a radio device, the radio device comprising a feed and a ground plane, the apparatus comprising:
    a monopole radiator;
    a first substantially planar auxiliary ground element having a first and a second dimension; and
    a switching apparatus configured to selectively couple the first substantially planar auxiliary ground element to the ground plane;
    wherein:
        the monopole radiator is grounded to the first substantially planar auxiliary ground element at a ground point and is fed by a feed point by the radio device feed via a feed conductor;
        the first substantially planar auxiliary ground element is disposed substantially external to an outside perimeter of the ground plane; and
        the first substantially planar auxiliary ground element is disposed substantially external to an outside perimeter of the monopole radiator.

13. The antenna apparatus of claim 12, wherein the first substantially planar auxiliary ground element is disposed along a first edge of the ground plane.

14. The antenna apparatus of claim 12, wherein the monopole radiator comprises a first portion and a second portion, the first portion having a third dimension and a fourth dimension, the first dimension being substantially perpendicular to the third dimension.

15. The antenna apparatus of claim 14, wherein:
the ground plane comprises a fifth and a sixth dimension; and
the sixth dimension is substantially parallel to the first dimension; and
the third dimension is substantially parallel to the fifth dimension.

16. The antenna apparatus of claim 12, wherein the first substantially planar auxiliary ground element is configured substantially coplanar with the ground plane.

17. The antenna apparatus of claim 14, wherein:
the first substantially planar auxiliary ground element is configured to be substantially coplanar with the first portion; and
the first dimension is larger than the second dimension.

18. The antenna apparatus of claim 17, wherein the feed conductor comprises a shield coupled to the first substantially planar auxiliary ground element at at least a first location.

19. The antenna apparatus of claim 12, wherein the feed conductor comprises a shield coupled to the first substantially planar auxiliary ground element at a plurality of locations.

20. The antenna apparatus of claim 12, wherein the antenna apparatus is adapted to operate in at least two frequency bands,
at least one of the bands comprising a frequency band compatible with a long term evolution (LTE) system.

21. The antenna apparatus of claim 20, wherein one of the at least two bands comprises a frequency range from about 700 MHz to about 960 MHz, and another of the at least two bands comprises a frequency band from about 1700 MHz to about 2200 MHz.

22. The antenna apparatus of claim 12, further comprising a second auxiliary ground element having a seventh dimension, the second auxiliary ground element electrically coupled to the first substantially planar auxiliary ground element;
wherein:
the third dimension is substantially parallel to the seventh dimension; and
the first dimension is substantially perpendicular to the seventh dimension; and
the second auxiliary ground element is coupled to the first substantially planar auxiliary ground element.

23. The antenna apparatus of claim 22, further comprising the switching apparatus configured to selectively couple the second auxiliary ground element to the ground plane.

24. A portable radio device, comprising:
a feed port;
a ground plane; and
an antenna apparatus comprising:
a radiator;
a first substantially planar auxiliary ground element having a first and a second dimension; and
a switching apparatus configured to selectively couple the first substantially planar auxiliary ground element to the ground plane;
wherein:
the radiator is coupled to the feed port at a first location via a feed conductor, and to the first substantially planar auxiliary ground element at a second location;
the first substantially planar auxiliary ground element is disposed substantially external to an outside perimeter of the ground plane; and
the first substantially planar auxiliary ground element is disposed substantially external to an outside perimeter of the radiator.

25. The portable radio device of claim 24 wherein:
the radiator comprises a first portion and a second portion, the first portion having a third dimension; and
a first dimension is substantially perpendicular to the third dimension.

26. The portable radio device of claim 24, further comprising a second auxiliary ground element having a fifth and a sixth dimension and grounded to the first substantially planar auxiliary ground element, wherein the fifth dimension is substantially perpendicular to the first dimension.

27. The portable radio device of claim 26, wherein the first substantially planar auxiliary ground element and the second auxiliary ground element each are substantially coplanar with the ground plane.

28. The portable radio device of claim 26, wherein the second auxiliary ground element is arranged substantially external to the outside perimeter of the first substantially planar auxiliary ground element.

29. The portable radio device of claim 26, wherein the antenna apparatus further comprises a switching apparatus configured to selectively couple a second auxiliary ground element to the ground plane.

30. The portable radio device of claim 24, wherein the portable radio device is selected from the group consisting of: a) mobile computer; b) a cellular telephone; and c) a portable navigation device.

31. The portable radio device of claim 24, wherein the antenna apparatus is adapted to operate in at least two frequency bands,
at least one of the bands comprising a frequency band compatible with a long term evolution (LTE) system.

32. The portable radio device of claim 31, wherein the switching apparatus is adapted to effect switching an operating band of at least one of the two frequency bands.

* * * * *